US011814168B2

(12) United States Patent
Usman

(10) Patent No.: US 11,814,168 B2
(45) Date of Patent: *Nov. 14, 2023

(54) SUSPENDED AERIAL VEHICLE SYSTEM WITH THRUSTER STABILIZATION

(71) Applicant: KYTE DYNAMICS, INC., Walnut, CA (US)

(72) Inventor: Irfan-ur-rab Usman, Redwood City, CA (US)

(73) Assignee: Kyte Dynamics, Inc., Walnut, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,544

(22) Filed: Dec. 22, 2021

(65) Prior Publication Data

US 2022/0363380 A1 Nov. 17, 2022

Related U.S. Application Data

(63) Continuation of application No. 17/151,035, filed on Jan. 15, 2021, now Pat. No. 11,319,065, which is a continuation of application No. PCT/US2020/036492, filed on Jun. 5, 2020.

(60) Provisional application No. 62/858,330, filed on Jun. 7, 2019.

(51) Int. Cl.
*B64C 39/02* (2023.01)
*B64C 27/02* (2006.01)

(52) U.S. Cl.
CPC .......... *B64C 39/022* (2013.01); *B64C 27/027* (2013.01)

(58) Field of Classification Search
CPC ............ B64C 39/022; B64D 5/00; B64D 3/00
See application file for complete search history.

(56) References Cited

U.S. PATENT DOCUMENTS

| 4,267,987 A | * | 5/1981 | McDonnell | B64D 39/00 244/6 |
| 9,623,949 B2 | | 4/2017 | Heppe | |
| 2005/0067524 A1 | * | 3/2005 | Johansen | B64G 1/005 244/3 |
| 2009/0152391 A1 | * | 6/2009 | McWhirk | B64B 1/70 244/30 |
| 2011/0192938 A1 | * | 8/2011 | DiMarzio | B64B 1/50 205/628 |

(Continued)

FOREIGN PATENT DOCUMENTS

WO  WO 2018/195869 A1  11/2018

OTHER PUBLICATIONS

"Development of SAM: cable-Suspended Aerial Manipiulator" (Sarkisov et al.) Mar. 6, 2019 (Mar. 6, 2019) [online] retrieved from <URL: https://arxiv.org/pdf/1903.02426/[pdf>.

(Continued)

*Primary Examiner* — Tye William Abell
(74) *Attorney, Agent, or Firm* — Knobbe, Martens, Olson & Bear, LLP

(57) ABSTRACT

A suspended aerial vehicle system includes an aerial vehicle with a thruster assembly and a supporting line attached to the aerial vehicle that is capable of supporting at least some of the weight of the aerial vehicle. The supporting line may have an adjustable length which when varied, and in coordination with variations in a thrust characteristic of the aerial vehicle, may change the position of the aerial vehicle. Other aspects are also described and claimed.

19 Claims, 16 Drawing Sheets

(56) References Cited

U.S. PATENT DOCUMENTS

| | | | | |
|---|---|---|---|---|
| 2015/0314871 | A1* | 11/2015 | von Flotow | B64D 1/12 |
| | | | | 244/137.4 |
| 2017/0024854 | A1* | 1/2017 | Humfeld | G06T 3/4053 |
| 2017/0297672 | A1* | 10/2017 | Heppe | B64C 37/02 |
| 2018/0297699 | A1* | 10/2018 | Ortiz | G05D 1/0866 |
| 2019/0241267 | A1* | 8/2019 | Sikora | B66C 13/063 |
| 2020/0051443 | A1* | 2/2020 | Zhao | G08G 5/006 |
| 2021/0147080 | A1* | 5/2021 | Crowley | B64D 1/22 |
| 2021/0179258 | A1* | 6/2021 | Ol | B64C 9/16 |
| 2021/0262442 | A1* | 8/2021 | Sia | B64C 39/024 |

OTHER PUBLICATIONS

International Search Report of PCT Application No. PCT/US20/36492, dated Sep. 2, 2020—3 pages.

* cited by examiner

SUSPENDED AERIAL VEHICLE SYSTEM WITH THRUSTER STABILIZATION

The present application is a continuation of U.S. patent application Ser. No. 17/151,035 filed on Jan. 15, 2021, which is a continuation of PCT Application No. PCT/US2020/036492 filed on Jun. 5, 2020, which claims the benefit of U.S. Provisional Application No. 62/858,330 filed on Jun. 7, 2019, the disclosures of which are expressly incorporated by reference herein in their entirety.

FIELD

An aspect of the disclosure here relates to an aerial vehicle, specifically an aerial vehicle that coordinates a supporting line and thruster stabilization. Other aspects are also described.

BACKGROUND

Avionics has benefitted greatly from recent innovations in batteries and the miniaturization of complex electronics, such as processors. One segment within the field that has expanded the most, both amongst hobbyists and professional usage is that of small-scale unmanned aerial vehicles, commonly known as drones. This emerging technology has found creative applications in a variety of fields, such as photography, military, wildlife conservation, and construction.

There remain developmental challenges to drone technology that still need to be overcome while future applications are being developed and explored. For instance, the traveling distance of drones continues to involve tradeoffs between factors such as size, battery cost, and noise generation. These considerations are important in applications that could have the drones navigating dense urban environments or carrying heavy loads over great distances, such as package delivery. These factors are especially relevant when it comes to convincing a regulatory body that the developed systems are viable and safe. Conventional solutions continue to focus on managing compromises between distance, size, and maneuverability.

SUMMARY

An aspect of the present disclosure is related to an aerial vehicle in which the thrust capability has been augmented by a supporting line connected to the aerial vehicle. The suspended aerial vehicle system with thruster stabilization provides a versatile solution to current challenges in the drone field that reduces the footprint and offers other benefits, such as prolonged flight time and higher load capacity over conventional drone offerings.

In an embodiment, a supporting line is attached to a load-bearing point on the aerial vehicle. The supporting line may be configured to be able to support the weight of the aerial vehicle and distribute the weight of the aerial vehicle into a "grounded" anchor point located outside of the aerial vehicle. For instance, the supporting line may connect to a winch system that is capable of winding in the supporting line, thus increasing tension within the supporting line and potentially pulling the aerial vehicle towards the winch system.

The aerial vehicle may have a form of directional thrust generation, such as rotors. For example, the aerial vehicle may be a "quadcopter" configuration. A controller may be able to manipulate the location of the aerial vehicle through coordinated action of the winch system, which winds in or lets out the supporting line, and the thrusters, which may vary the magnitude of force produced and angle of thrust produced relative to the supporting line. This coordination allows the controller to optimize the energy output necessary to move or maintain the position of the aerial vehicle because the thrust that may have been necessary to counteract gravity may instead be offset by the support line. If less force output is necessary from the thrusters, then the size of the thrusters may be reduced, as well as supporting structures such as batteries, while the aerial vehicle may maintain equal or greater abilities in areas such as flight time and load capacity. Smaller thrusters and support structures within the aerial vehicle gives the aerial vehicle a smaller footprint and noise profile, increasing the maneuverability of the aerial vehicle.

Coordination between the winch system and the thrusters may allow other benefits. For instance, due to the ability of the supporting line to divert the necessity of the thruster to counter environmental forces, such as gravity or wind load, the thrusters may be used to efficiently orient the aerial vehicles. For instance, the aerial vehicle may maintain a static position while oriented perpendicular to the direction of gravity by maximizing tension within the supporting line.

In an embodiment, the aerial vehicle may be connected to another vehicle by the supporting line. For example, the vehicle may be an aerial vehicle in a "mothership" configuration, which allows the mothership to bear at least a portion of the weight of the aerial vehicle. The mothership may have characteristics that enhance the efficiency of long duration flight, giving the system benefits of large scale aircraft while maintaining the accessibility that the small aerial vehicle provides.

The system may be configured for specific functionality. For instance, the aerial vehicle may be capable of attaching to payloads, cleaning remote surfaces, defusing armament, or any of various functions that are enabled by the benefits provided by the system.

Figure 1:
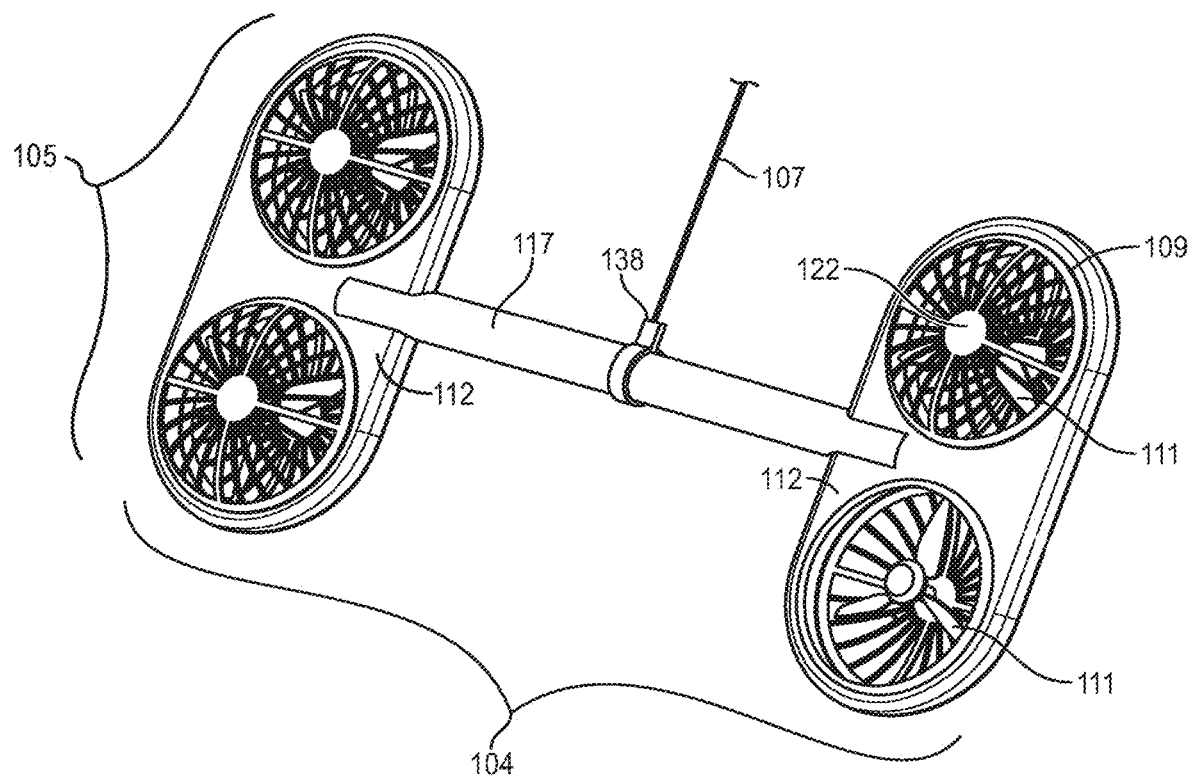
FIG. 1 illustrates an exemplary suspended aerial vehicle system with thruster stabilization.

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Embodiments of the present disclosure are directed to, among other things, a thruster-stabilized suspended aerial vehicle system. The thruster-stabilized suspended aerial vehicle system may include an aerial vehicle that is connected to a support line, wherein the support line may be anchored remotely to an anchor point. In an example embodiment, the aerial vehicle system may include an unmanned aerial vehicle (UAV) that is attached to a supporting line which connects the UAV to an anchor point, such that a first end of the supporting line is connected to the UAV. Although the present disclosure discusses applications where there is no human pilot onboard the aerial vehicle, it is conceivable that in aspects of the present disclosure, the aerial vehicle may have a pilot or human user onboard without departing from the inventive concept. The anchor point may include a winch system that may operably change the length of the supporting line, or winch line, that is deployed. The anchor point that the winch system is attached to may vary depending on the application. For instance, the anchor point may be a stable surface, such as the top of a building, or a mobile surface, such as a second aerial vehicle.

Providing a vertical lifting force to the UAV in the form of the winch system magnifies desirable characteristics of the UAV to make it an ideal solution for wide ranging applications while addressing some core deficiencies of UAVs. The winch system allows for reduced energy consumption by the UAV, as the amount of thrust the UAV needs to produce to maintain a desired elevation is reduced or eliminated. The footprint of the UAV itself can also be reduced, such as by reducing the thruster size necessary to produce sufficient lift and by offloading from the UAV components such as a battery or a controller that are essential and could be connected via the supporting line. In addition, as the UAV does not have to be entirely self-supporting in the vertical direction, the available thrust/power in other axes (lateral and attitude control) is greatly increased.

Additionally, the versatility of the system, which may provide for various types of anchor points and UAV functionalities, allows for many applications. For example, the winch system may allow the UAV to produce thrust in unconventional directions. When the UAV is being actively suspended by the winch system, it may not be necessary for the thrusters on the UAV to provide lift in order to maintain the elevation of the UAV. The thrusters may be used to provide force in a direction perpendicular to gravity. For example, if the UAV were tasked with placing decals on a specified placement point on an exterior window of a skyscraper, the winch system may be anchored above the placement point. With the winch system supporting the UAV at the desired elevation, the thrusters on the UAV may produce a thrusting force aimed at the window that is sufficient to adhere the decal to the window. In addition, the winch system may dynamically adjust the supporting line length in order to allow traversal of the UAV in a plane orthogonal to gravity.

The UAV may be configured to perform services enabled by the ability of the UAV to effectively navigate tight airspace. For instance, the UAV may be able to deliver packages onto a balcony, potentially circumventing an overhang and constrictive enclosure. This ability allows the UAV to perform deliveries in otherwise dense and restrictive urban environments. Examples of packages that may be delivered by such means include consumer goods from a warehouse, fulfillment center, or waystation, such as books, clothing, or electronic supplies. Other examples may include point-to-point deliveries, such as food, medical equipment, and pharmaceuticals. These examples are non-limiting, as it is conceivable that the UAV may be capable of pickup and delivery of any cargo that fits within the expanded size and weight threshold achievable by the system.

Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

The UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should change locations, while the UAV's navigation system autonomously controls more fine-grained navigation decisions, such as the route selection, obstacle avoidance, and so on. Other examples are also possible.

The UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 illustrates an exemplary aspect of a thruster-stabilized suspended aerial vehicle system, herein referred to as a suspended aerial vehicle system. The suspended aerial vehicle system may include a UAV 104 and a support line 107. In this illustration, UAV 104 takes the form of a multicopter, which includes a thruster assembly 105 that utilizes four rotors 109, although other examples are possible with five or more rotors, less than four rotors, as well as combinations of rotors and actuators used to adjust the rotor thrust relative to the rotorcraft. As discussed previously, it is conceived that UAV 104 can take the form of an aerial vehicle that does not rely on, or does not rely exclusively on, rotors for thrust generation. For instance, UAV 104 may contain thrusters that are directionally orientable. The thrusters may be connected to a tank or hose capable of supplying the thrusters with materials that are ejected from the thruster to provide a force. Some examples are gas-type thrusters, chemical propellants, and directed airflow blowers. It is also considered that UAV 104 may utilize combustion-style motors to produce thrust. It is possible to conceive of other examples of thrusters capable of producing directionally-focused propulsion without straying from the inventive concept. Thus, while the thruster assembly 105 demonstrates an embodiment of the present disclosure, the terms "thrusters" and "thrust engine" used herein may refer to any form of directionally orientable thrust generating system known in the art.

The UAV 104 may have maneuvering capabilities, such that the pitch, roll, yaw, and/or altitude of the UAV 104 may be adjusted through various means. For example, the rotors 109 provide propulsion and maneuverability for the UAV 104. More specifically, each rotor 109 includes blades 111 that are attached to a motor. Configured as such the rotors 109 may allow the UAV 104 to take off and land vertically, to maneuver in any direction, and/or to hover. Furthermore, the pitch of the blades 111 may be adjusted as a group and/or differentially, and may allow the UAV 104 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades 111 is adjusted to perform such aerial maneuvering, this may be referred to as adjusting the "collective pitch" of UAV 104. Additionally or alternatively, UAV 104 may adjust the rotation rate of the rotors 109, collectively or differentially, in order to maneuver. For example, by maintaining a constant speed of three rotors 109 and decreasing the speed of a fourth rotor, the UAV 104 can roll right, roll left, pitch forward, or pitch backward, depending upon the rotor 109 that is selected for a reduction in speed. Specifically, the UAV 104 may roll in the direction of the rotor 109 with the decreased speed. As another example, increasing or decreasing the speed of all rotors 109 simultaneously can result in the UAV 104 increasing or decreasing its altitude, respectively. As yet another example, increasing or decreasing the speed of rotors 109 that are turning in the same direction can result in the UAV 104 performing a yaw-left or yaw-right movement. These are but a few examples of the different types of movement that can be accomplished by independently or collectively adjusting the RPM and/or the direction that rotors 109 are spinning. Similar maneuvering may be contemplated in an embodiment that does not utilize rotors for thrust.

The UAV 104 may also include an enclosure 112. Enclosure 112 may contain and/or connect the rotors 109 and contain other necessary or desired components, e.g., motors, control electronics such as an inertial measurement unit (IMU) and/or an electronic speed controller, batteries, other sensors, and/or a payload, among other possibilities. The UAV 104 shown includes two enclosures 112, wherein each enclosure 112 is configured to contain two rotors 109, and the enclosures 112 are connected by an axle 117. However, it is contemplated that a single enclosure 112 may contain all the rotors 109 of the UAV 104. Alternatively, three or more enclosures 112 may be used, with each enclosure 112 containing at least one rotor 109, and with each enclosure 112 connected so as to form part of the UAV 104.

The axle 117 may allow for independent rotation for each enclosure 112 connected to the axle 117 such that a first enclosure on a proximal end of the axle 117 may rotate in a first direction and a second enclosure on a distal end of the axle 117 may rotate in a second direction. Additionally, the axle 117 may allow the first enclosure to rotate in the same direction but to a different degree or at a different speed than the second enclosure is rotated. The axle 117 may also allow a first enclosure to remain in a static orientation while the second enclosure may rotate relative to the first enclosure. In some embodiments, the UAV 104 may utilize multiple axles 117. For instance, the axles may be connected orthogonally, with each axle able to rotate independently of the other axles, such that the rotors connected to a first axle may maintain an orientation independent from the rotors connected to a second axle.

In a further aspect, UAV 104 includes rotor protectors 122. Such rotor protectors 122 can serve multiple purposes, such as protecting the rotors 109 from damage, protecting the UAV 104 structure from damage, and protecting nearby objects from being damaged by the rotors 109. Further, the rotor protectors 122 may serve as noise dampeners to alleviate the sound created by the high-speed rotation of the rotors 109. It should be understood that an embodiment that does not include rotor protectors 122 is also possible. Further, rotor protectors 122 of different shapes, sizes, and function are possible, without departing from the scope of the invention.

In a further aspect, UAV 104 includes one or more communication systems. The communications systems may include one or more wireless interfaces and/or one or more wireline interfaces, which allow UAV 104 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, the UAV 104 may include communication systems that allow for both short-range communication and long-range communication. For example, the UAV 104 may be configured for short-range communications using Bluetooth and for long-range communications under a CDMA protocol. In such an embodiment, the UAV 104 may be configured to function as a "hot spot;" or in other words, as a gateway or proxy between a remote support device and one or more data networks, such as cellular network and/or the Internet. Configured as such, the UAV 104 may facilitate data communications that the remote support device would otherwise be unable to perform by itself.

For example, UAV 104 may provide a WiFi connection to a remote device, and serve as a proxy or gateway to a cellular service provider's data network, which the UAV 104 might connect to under an LTE or a 5G protocol, for instance. The UAV 104 could also serve as a proxy or gateway to a high-altitude balloon network, a satellite network, or a combination of these networks, among others, which a remote device might not be able to otherwise access.

An aspect is directed toward the support line 107 that connects to the UAV 104. The support line 107 may be connected to the UAV 104 at a first end of the support line 107. The support line 107 may be made from various materials. For instance, if the support line 107 need be flexible, the support line 107 may include high tensile-strength polymeric fibers, metallic and/or synthetic cables, rope, and other materials that exhibit sufficient strength and flexibility. In another aspect, the support line 107 may be rigid, such that the distance between the first end of the support line 107 and a second end of the support line 107 is substantially fixed. In yet another aspect, the support line 107 may involve multiple rigid members, such as in a chain configuration, or in a telescoping rod configuration.

The support line 107 may be connected to a point on the UAV 104 that is designed to distribute some or all of the weight of the UAV 104 into the support line 107. For instance, the support line 107 may be connected directly to an element of the UAV 104, such as the axle 117, or the thruster assembly 105. The support line 107 may include a snap link at the first end of the support line 107, which may mate with a u-bolt connection that is attached to an element of the UAV 104, although similar attachment means may be conceived without departing from the inventive concept. Alternatively, the support line 107 may be connected to a specially designed support line attachment mechanism that is connected to a point on the UAV 104 or that is connected to another member or members that are connected to the UAV 104. The support line 107 may be attached to the UAV 104 in such a manner as to allow free rotational degrees of freedom relative to the thruster assembly 105 while maintaining the capability to take up a part or all of the gravity and inertial loads of the suspended aerial vehicle system. For example, as illustrated, the supporting line 107 may be connected to a rotary bearing 138 that is on the axle 117.

The supporting line 107 may include a conduit that connects the UAV 104 to a source of power or data. For instance, in an embodiment where at least a portion of the power distribution system is not "onboard" the UAV 104, the conduit may transfer power from a power source located external to the UAV 104, such as at the second end of the supporting line 107 to the UAV 104. In this case, the conduit may include electrical cables that connect a battery at the second end of the supporting line 107 to an onboard power distribution system on the UAV 104. It is contemplated that the energy storage may be located within the onboard power distribution system, in which case a power cable within the conduit may be used to charge the onboard energy storage device, such as a battery. In another example, the conduit may carry a data-transmission wire formed of a conductive material (e.g., for conveying data-encoded electrical signals) and/or a fiber optic line (e.g., for conveying data-encoded optical signals). A central controller and/or operator, which may be located at the second end of the supporting line 107, may control operations of the UAV 104 remotely by sending instructions through the signal cables to the UAV 104, which may have an onboard processor. Likewise, the UAV 104 may use the signal cables to send sensor data back to the central controller and/or operator.

Figure 2:
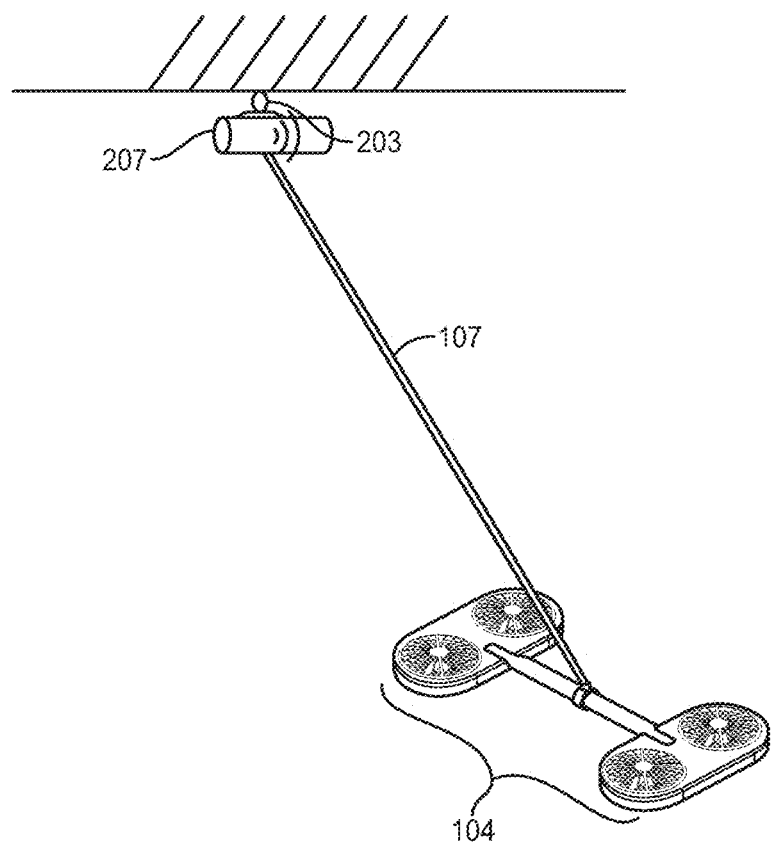
FIG. 2 illustrates an exemplary suspended aerial vehicle system with thruster stabilization that is connected to an external surface.

FIG. 2 illustrates an aspect of the present embodiment wherein a second end of the supporting line 107 may be substantially connected to an anchor point 203 that is located outside of the UAV 104. The anchor point 203 may be fixed to an external surface, such as a pole or the roof of a building, such that the anchor point 203 is incapable of independently changing position relative to the external surface that the anchor point 203 is attached to. The second end of the supporting line 107 may be attached to the anchor point 203. For instance, the anchor point 203 may be a hook that is bolted to the external surface, while the second end of the supporting line 107 may be fastened to the hook.

The anchor point 203 may include a mechanical device that allows the length or tension of the supporting line 107 between the first end of the supporting line 107 and the second end of the supporting line 107 to vary. An example of such a mechanical device is a winch system, wherein the winch system may include a winch 207 to pull in (wind up) or let out (wind out) the supporting line 107 into a spool when the spool is actuated by a motor, examples of which are a snubbing winch, a wakeskate winch, a glider winch, and an air winch. Although specific embodiments have been provided, the term "winch system" may refer to any of various systems and means for varying the length of the supporting line 107 that may be conceived without departing from the inventive concept.

In an embodiment where the anchor point 203 includes a winch system, the winch 207 may be fixable. For instance, the winch system may be attached to a surface near or on the anchor point 203, either permanently or temporarily, such as by bolting the winch system to the external surface or by connecting the winch system with a pairing mechanism located on the external surface. If the suspended aerial vehicle system is to be used adjacent to a building, the winch 207 may be attached on or near the top of the building. The winch 207 may also be connected to a moveable support, such as a telescoping pole, allowing the location of the anchor point 203 to be moved.

Figure 3A:
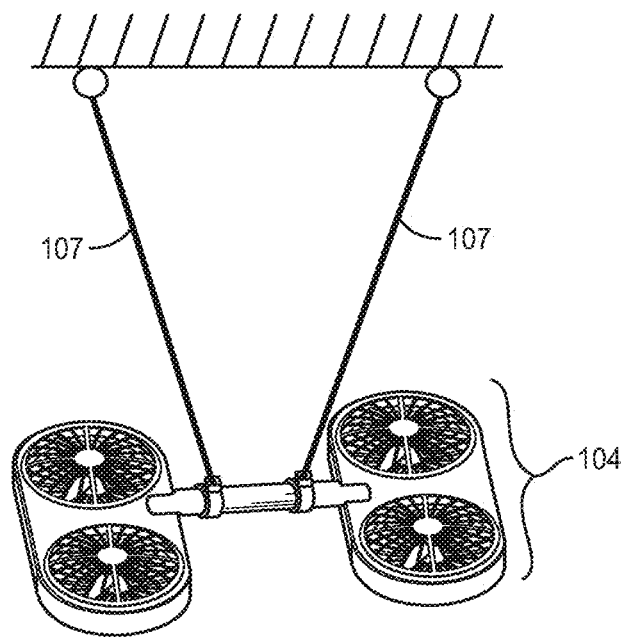
FIG. 3A-3C illustrate exemplary configurations of the suspended aerial vehicle system with thruster stabilization.
Figure 3B:
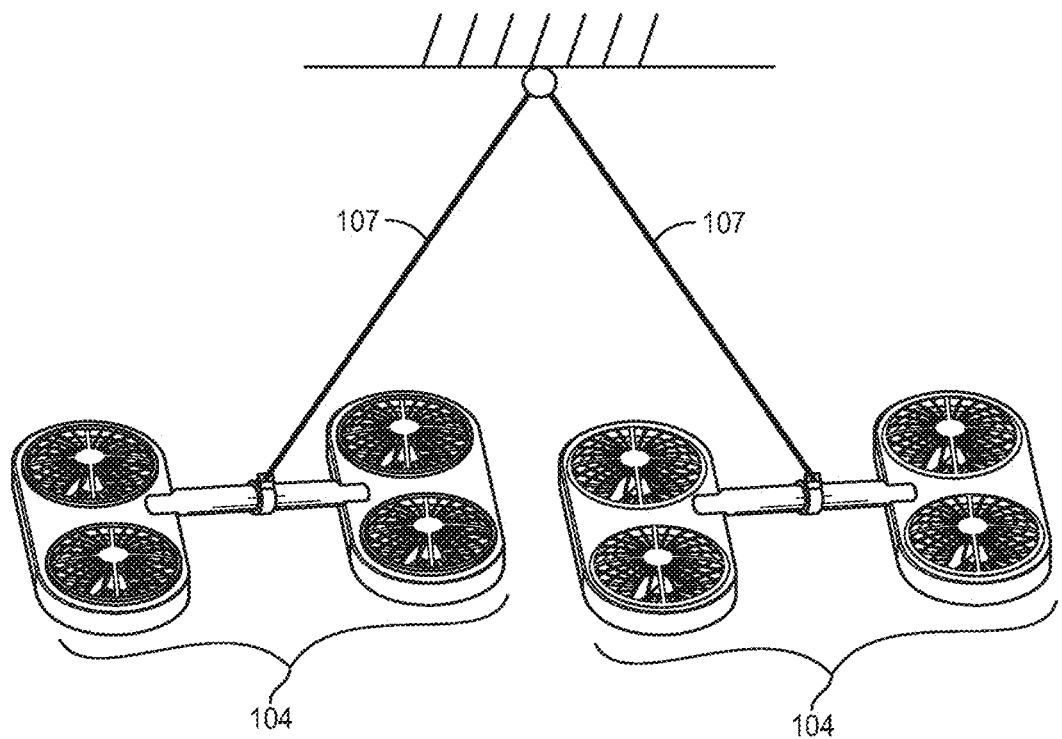

FIG. 3A illustrates an embodiment that includes a suspended aerial vehicle system with multiple support lines 107. The UAV 104 may have attachment points for two or more supporting lines 107. When two or more supporting lines are attached to the UAV 104, the supporting lines may be manipulated independently or in coordination. For instance, a first supporting line may be attached to a first end of the UAV 104 and a second supporting line may be attached to a second end of the UAV 104. The first end of the UAV 104 may be counterbalanced by the second end of the UAV 104. When it is desirable to tilt the UAV 104 such that the elevation of the first end is different from the elevation of the second end, in order to, for example, orient the UAV 104 parallel to the direction of gravity, the length of the first supporting line may be changed in coordination with the length of the second supporting line in order to achieve the desired operated to adjust the elevation of the first end of the UAV 104 by either lowering or raising the first end of the UAV 104 while the second supporting line may be substantially static to maintain the elevation of the second end of the UAV 104 relative to the first end of the UAV 104. Three supporting lines attached to the UAV 104 may achieve greater control over the orientation of the UAV 104. It is conceivable that multiple supporting lines, wherein each supporting line is connected to one or more UAVs, may be connected to a single anchor point, such as in FIG. 3B. It is conceivable that all supporting line may be manipulated by a single winch system.

Figure 3C:
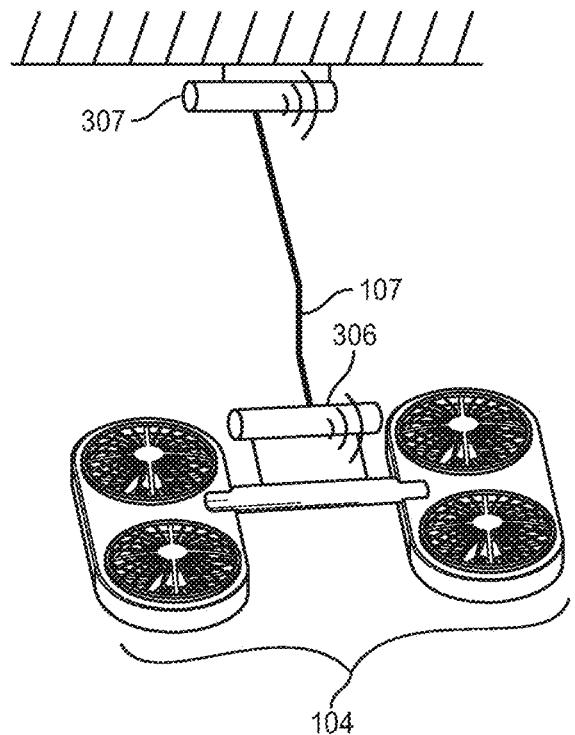

FIG. 3C illustrates an example where a winch 306 may be located at the first end of the supporting line 107, such that the winch 306 is "onboard" the UAV 104. Further, in an embodiment where there are multiple winch systems utilized, it is contemplated that there may be a first winch 306 that is located at or near a first end of the supporting line 107 and a second winch 307 that is located at or near a second end of the supporting line 107. In an example, the first winch 306 may conduct "finer", or more sensitive, length corrections relative to the second winch 307, which may conduct coarser adjustments of the length of the supporting line 107. It is possible to contemplate additional configurations of winch systems and supporting lines without straying from the inventive concept.

Figures 4A, 4B, 4C:
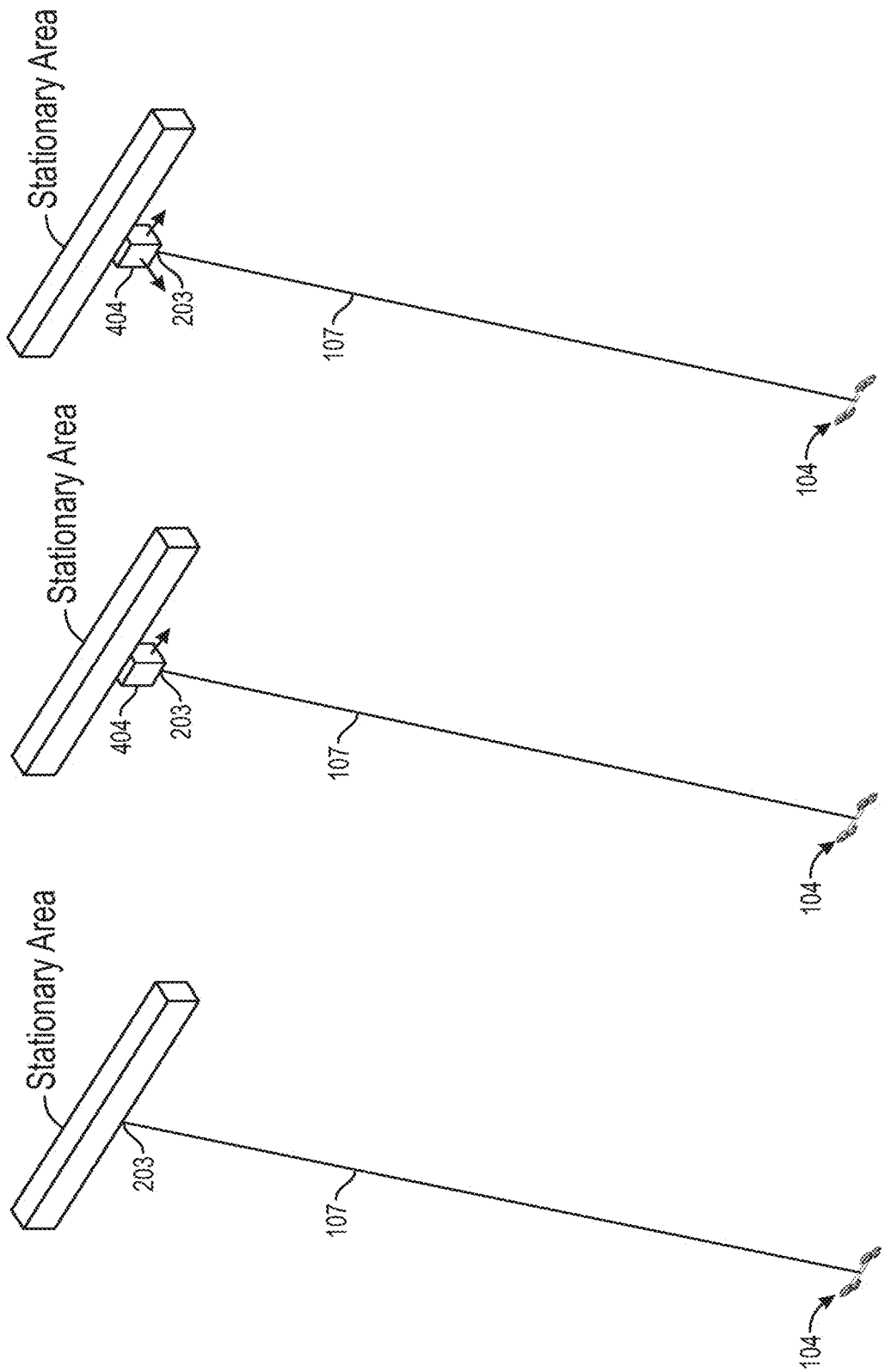
FIG. 4A-C illustrates exemplary configurations of the suspended aerial vehicle system with thruster stabilization in relation to a stationary area.
Figure 5:
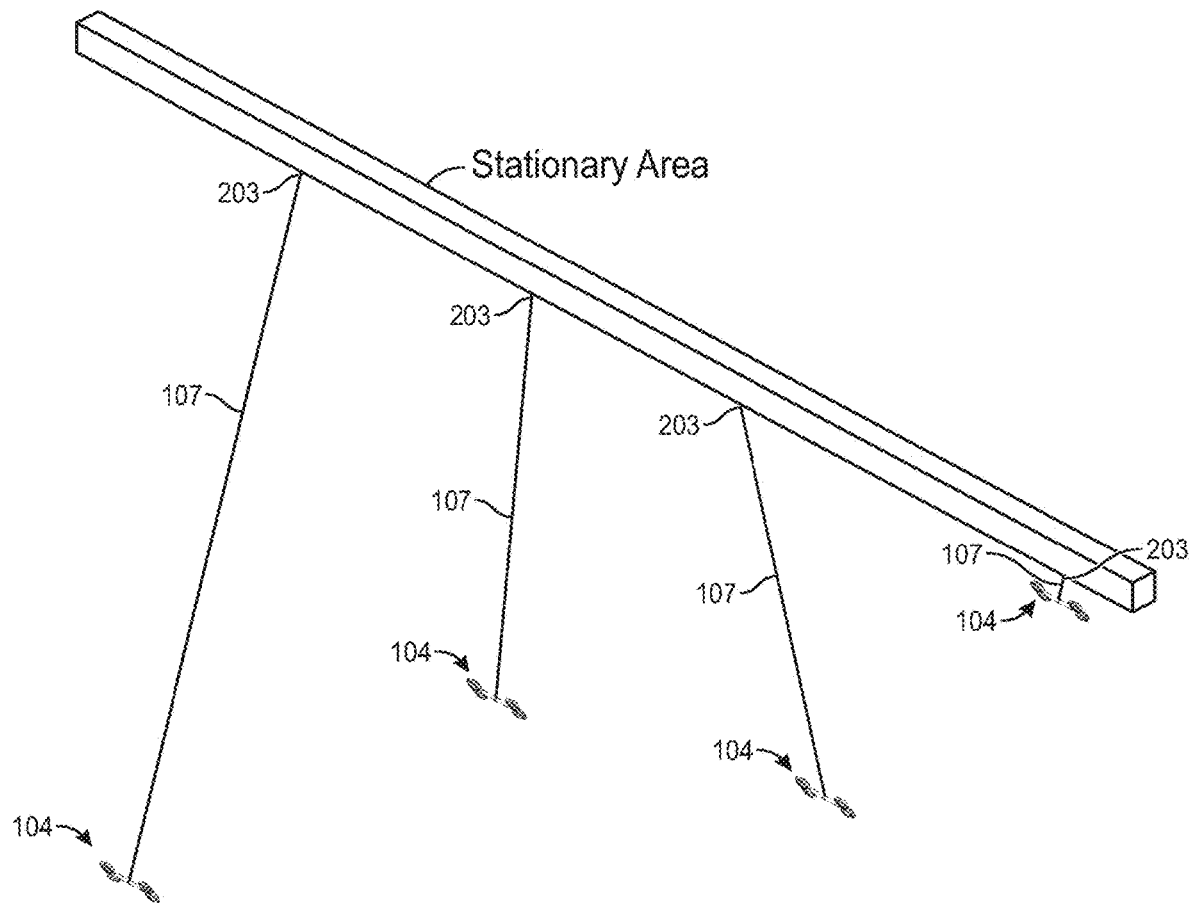
FIG. 5 illustrates an exemplary configuration of multiple suspended aerial vehicle systems with thruster stabilization in relation to a stationary area.

In an aspect, the anchor point 203 may be temporary, changeable, or established during operation of the suspended aerial vehicle system, such as by grapnel. FIG. 4A shows an anchor point 203 that is located on a stationary area. In FIG. 4B, the anchor point 203 is located on a conveyance 404 that is capable of motion along a single axis relative to the stationary area. For example, the conveyance 404 may be a track-based transportation system that can move the anchor point 203 to predetermined locations. In FIG. 4C, the anchor point 203 is located on a conveyance 404 that is capable of translating across a plurality of axes relative to the stationary area. For example, the conveyance 404 may be a vehicle capable of traversing a two dimensional or three dimensional concourse and moving the suspended aerial vehicle system to any location within range of the vehicle. In another example, the conveyance 404 may be a motion stage, such as a gantry system. Multiple conveyances 404 may be used within a vicinity on the stationary area, as demonstrated in FIG. 5, such that each of the conveyances 404 may access portions of the same work volume, and each of the suspended aerial vehicle systems may have any one of the configurations described in FIGS. 4A-C.

Figure 6:
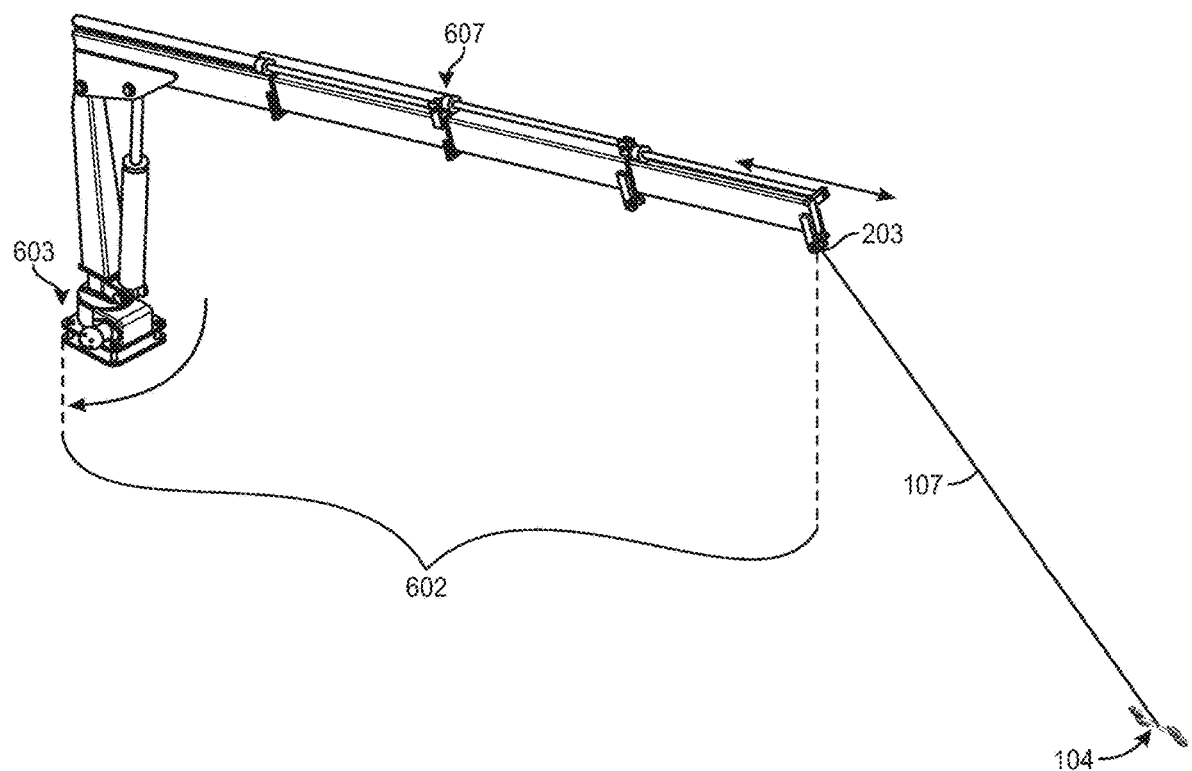
FIG. 6 illustrates an exemplary configuration of the suspended aerial vehicle system with thruster stabilization that is fixed to a system that is capable of translating the location of an anchor point.

FIG. 6 demonstrates another aspect of the present disclosure wherein the anchor point 203 may be fixedly connected to a system that is capable of translating the location of the anchor point 203. The system shown is a crane 602 that may relocate the anchor point 203 through combining a rotational base 603 with a telescoping arm 607. The rotational base 603 may be able to rotate the telescoping arm 607 to any orientation up to 360 degrees, although the rotation of the rotational base 603 may be limited within that range, giving the rotational base 603 reduced freedom of rotation. The telescoping arm 607 may have an adjustable length, such that that the anchor point 203 may be translated closer to the rotational base 603 when the length is reduced and further from the rotational base 603 when the length of the telescoping arm 607 is increased.

Figure 7:
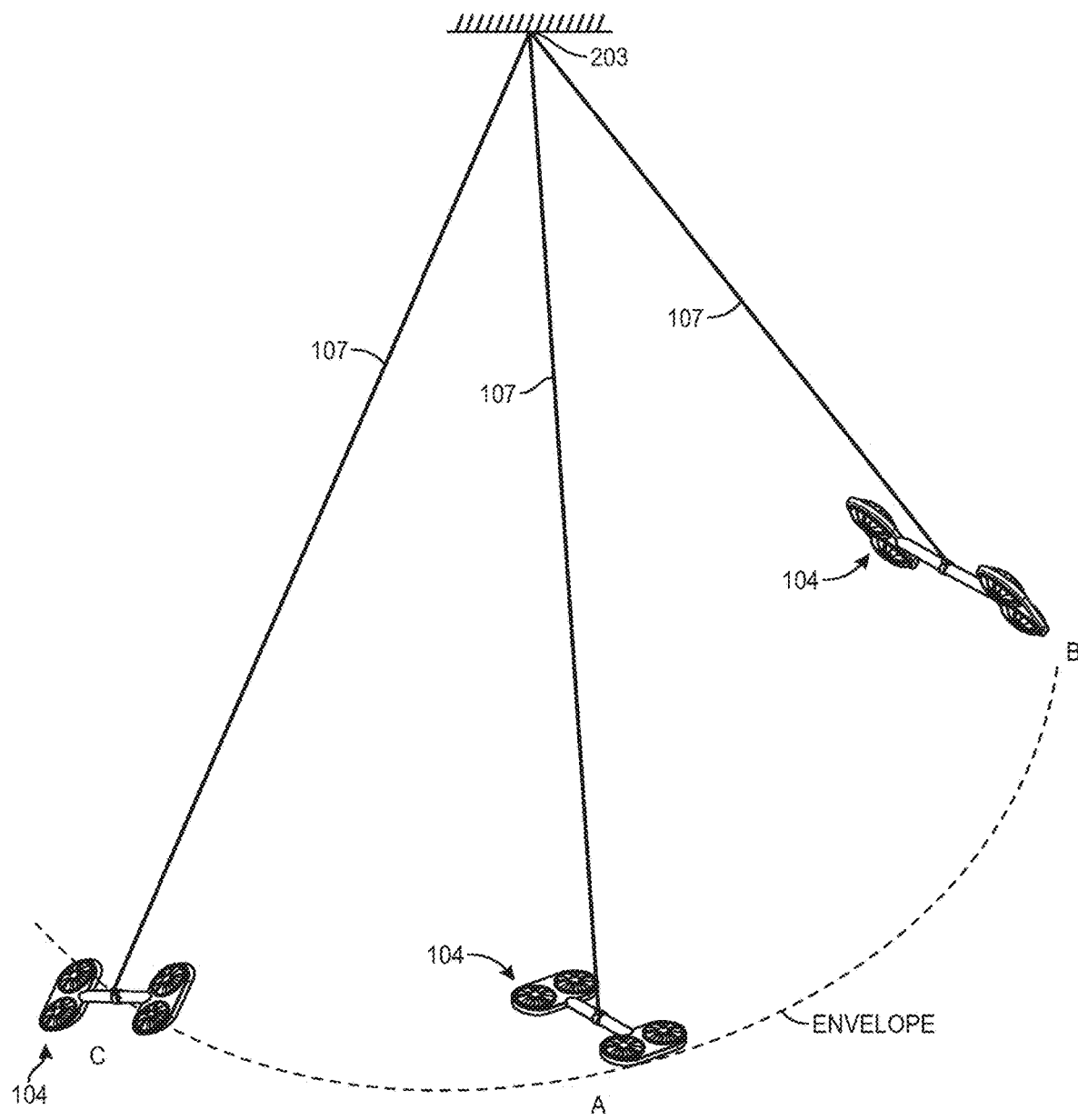
FIG. 7 illustrates positions of the suspended aerial vehicle system with thruster stabilization on an exemplary flight path.

In an embodiment wherein the supporting line 107 is connected to the winch system, movement of the UAV 104 may be adjusted along up to six degrees of freedom through changing the length of the supporting line 107 and by changing thrust characteristics of the thrusters. The possible positioning of the UAV 104 may be governed by an "envelope," as seen in FIG. 7, wherein the envelope is defined as the volume of a sphere that encircles the winch system, such that the end of the supporting line 107 furthest from the UAV 104, which may be connected to a winch or the anchor point 203, is the epicenter of the sphere, and the radius of the sphere is the length of the supporting line 107. The outer bound of the sphere is the furthest the supporting line 107 can extend in all directions. Generally, changing the length of the supporting line 107 may impact the vertical position of the UAV 104 within the envelope. For example, if the winch system is at position A, the winch system may pull in more supporting line 107 to the spool, which may act to move the UAV 104 towards the height, relative to the anchor point 203, of position B. If the winch system lets out more supporting line from the spool when the UAV 104 is at position B, the UAV 104 may move towards position A. In this way, the distance between the winch system and the UAV 104 may be increased or decreased by increasing or decreasing the amount of supporting line that is actively being used to support the weight of the UAV 104, allowing for the position of the UAV 104 to be manipulated along the vertical axis. The length of supporting line 107 that is actively being used to support the weight of the UAV 104 may be adjusted by other means, such as by using linear actuators to vary the length of the supporting line 107.

Similarly, adjustments to thrust characteristics of the thrusters may move the UAV 104 within the envelope. For instance, to move UAV 104 from position A towards the direction of position C, the thrusters may be oriented to produce thrust towards the right, propelling the UAV 104 towards the left.

FIG. 7 also demonstrates how the suspended aerial vehicle system may achieve positioning of the UAV 104 within the envelope through variations in the length of the supporting line 107 that are coordinated with variations in characteristics of the thrust produced by the thrusters onboard the UAV 104, wherein position availability for the UAV 104 within the envelope includes substantially all points in three-dimensional space within the envelope. In an aspect, it may be desirable for the UAV 104 to move from a first position to a second position within the envelope. The suspended aerial vehicle system may direct the winch system to spool or unspool a length of supporting line 107 while the suspended aerial vehicle system may simultaneously and/or contemporaneously direct the thrusters to produce thrust in a direction and magnitude relative to the UAV 104 so as to move the UAV 104 to the desired location in a coordinated manner. As the UAV 104 moves from position A to position B, the length of supporting line 107 is reduced to pull the UAV 104 upward while the thrusters orient the UAV 104 in order that the thrusters may produce thrust pushing the UAV 104 toward the right, allowing the UAV 104 to travel upwards and to the right in a substantially diagonal fashion. If the UAV 104 were to locate from position A to position C, the length of the supporting line 107 would need to be extended while the thrusters orient the UAV 104 in order that the thrusters may produce thrust pushing the UAV 104 toward the left, allowing the UAV 104 to travel substantially horizontally.

This coordination between the magnitude and lift direction of the thrusters and length and angle of the supporting line 107 in combination with variable thrust availability in non-vertical axes due to the load capability of the supporting line 107 enables precision positioning. For example, through coordinated manipulation of the length of the supporting line 107 and thruster orientation, the UAV 104 may translate in the horizontal plane without changing vertical location. This enables the suspended aerial vehicle system to place the UAV 104 at a specified position relative to the location of the winch system at some or all points during flight, such as to navigate a tight entry window. The thrusters of the UAV 104 may adjust the orientation of the UAV 104 to an angle relative to nadir while the length of supporting line 107 may be adjusted as the UAV 104 approaches the entry window to maintain an optimal or desired angle of the supporting line 107 relative to nadir.

Figure 8:
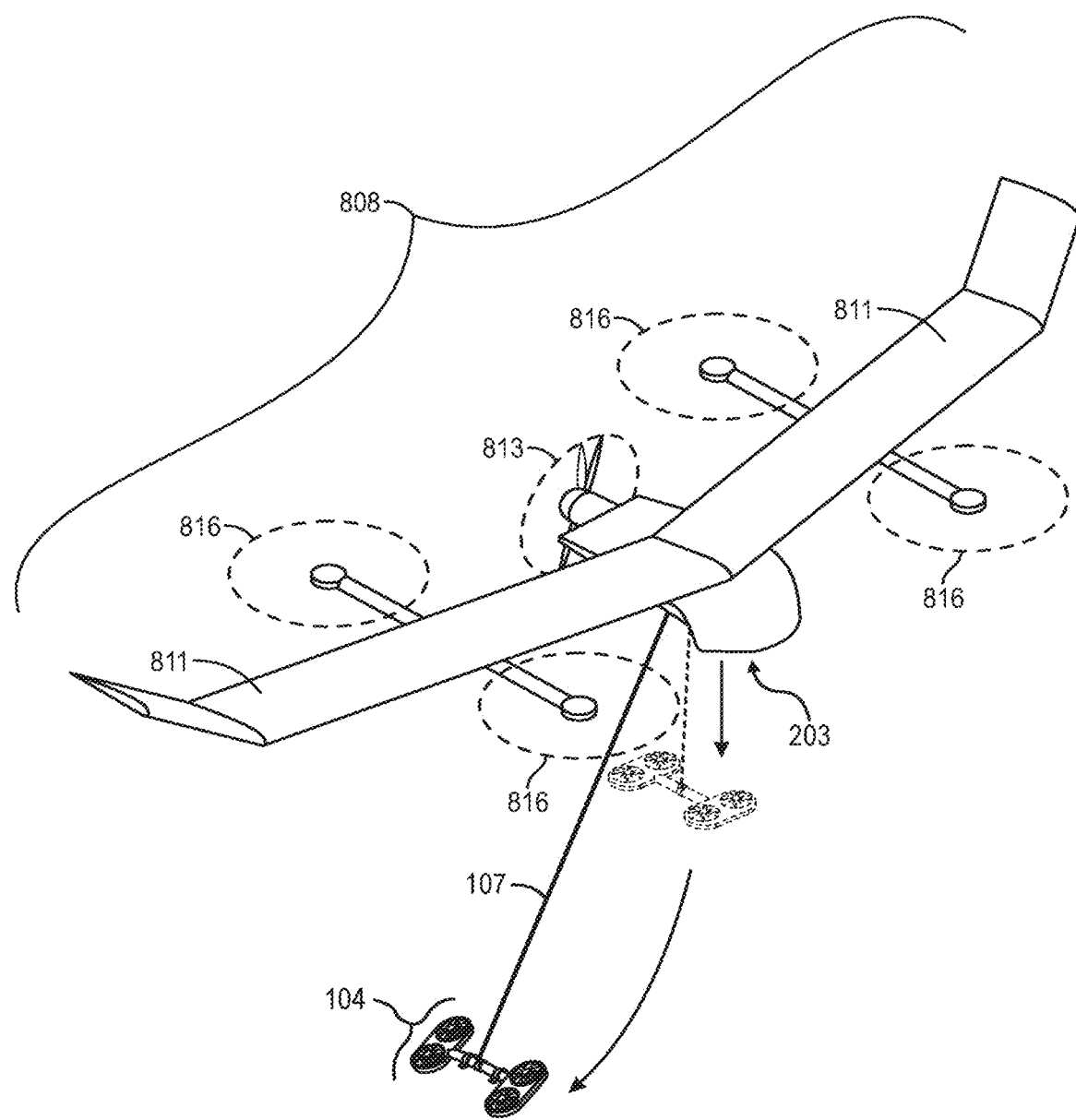
FIG. 8 illustrates an exemplary configuration of the suspended aerial vehicle system with thruster stabilization that includes a mothership.

FIG. 8 shows an aspect of the present disclosure in which the anchor point 203 is located on a vehicle. The vehicle may be any of a variety of land, sea, airborne, and multimodal vehicles. In the example shown, the vehicle may be an aerial vehicle 808, referred to herein as a "mothership", wherein the mothership 808 is large enough to support some or all of the weight of the UAV 104 when the mothership 808 is in transit. The mothership 808 may be a pure fixed wing craft, a rotorcraft, and any other craft capable of achieving flight. In the illustration, the mothership 808 shown is a combined/transition aircraft with both the lifting surfaces 811 and propeller 813 typical of a fixed wing aircraft and thrusters 816 characteristic of a rotorcraft. The mothership 808 configuration shown has the advantage of allowing the long range cruising of a fixed-wing aircraft with the hovering and precise locating capabilities of a rotorcraft. The mothership 808 may also have rotorcraft-enabled vertical take off and landing (VTOL) capabilities.

In the illustration, the anchor point 203 is located on an underside of the mothership 808, although other locations for the anchor point 203 are possible. The UAV 104 may attach securely to the mothership 808 when the UAV 104 is "parked," or not in flight. The mothership 808 may have a dock (not shown) that the UAV 104 resides in when the UAV 104 is not in flight. The dock may be internal (such that the UAV 104 is stored substantially within the mothership 808), external (such that the UAV 104 attaches to an outer surface of the mothership 808), or a combination of both. The dock may include clips that securely hold the UAV 104 in place. The dock may release the UAV 104 when the UAV 104 is prepared for flight, allowing the UAV 104 to exit from the mothership 808. The length of the supporting line 107 may be increased by the winch system, lowering the UAV 104 from the mothership. When the UAV 104 has exited the mothership 808, the thrusters of the UAV 104 may activate, directing the flight of the UAV 104 solely or in coordination with the winch system. When the UAV 104 is finished with flight and ready to park, the UAV 104 may return to the mothership 808 and attach to the dock.

Figure 9:
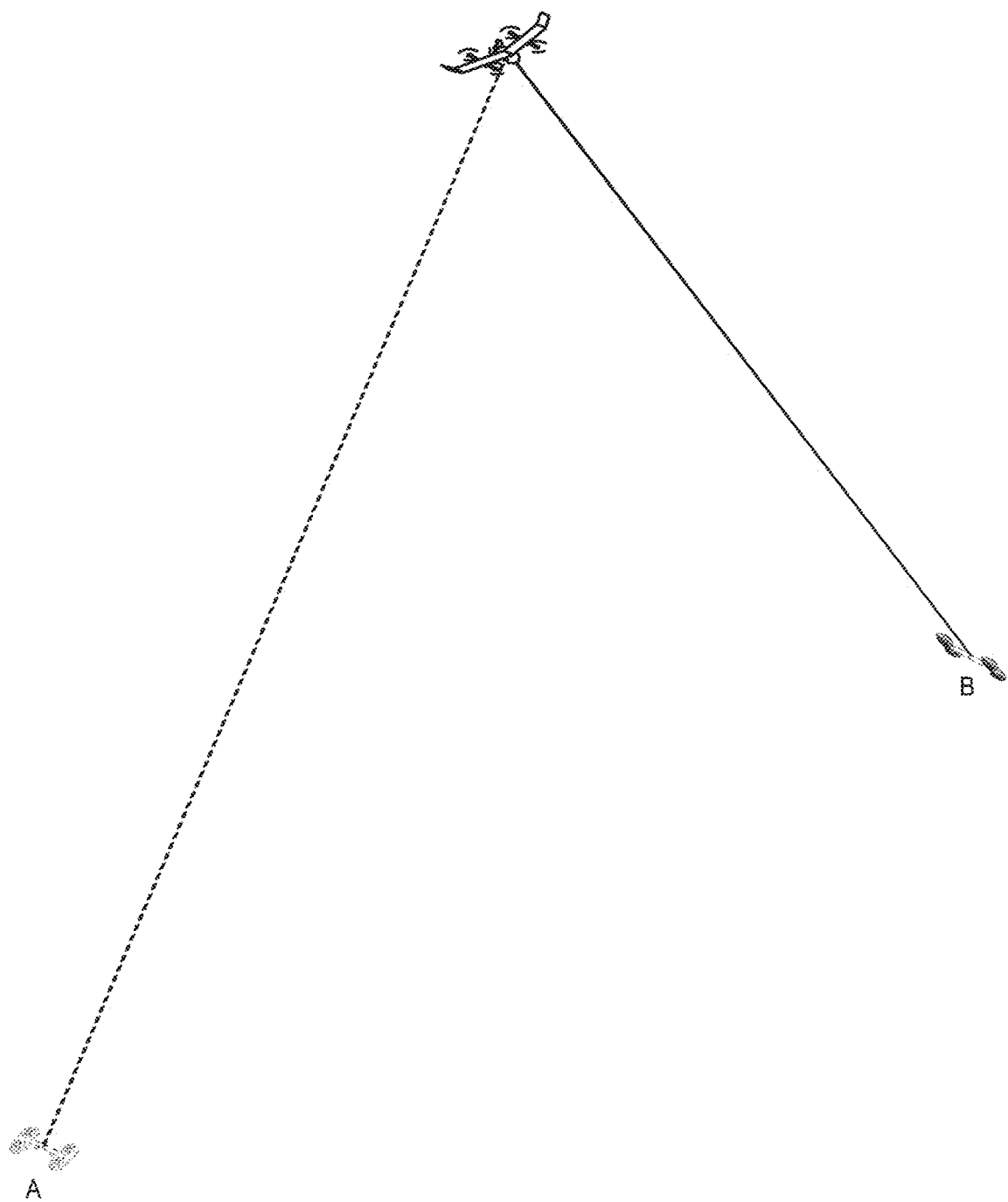
FIG. 9 illustrates an exemplary configuration of the suspended aerial vehicle system with thruster stabilization that includes multiple aerial vehicles connected to the mothership.

FIG. 9 demonstrates how the suspended aerial vehicle system may achieve precise positioning of the UAV 104 relative to the mothership 808 within the envelope through variations in the length of the supporting line 107 that are coordinated with variations in characteristics of the thrust produced by the thrusters onboard the UAV 104 in a similar manner to that demonstrated in FIG. 7. Through coordination of the winch system and the thrusters, the UAV 104 may be relocated from position A to position B relative to the mothership through any of various possible trajectories.

Figure 10:
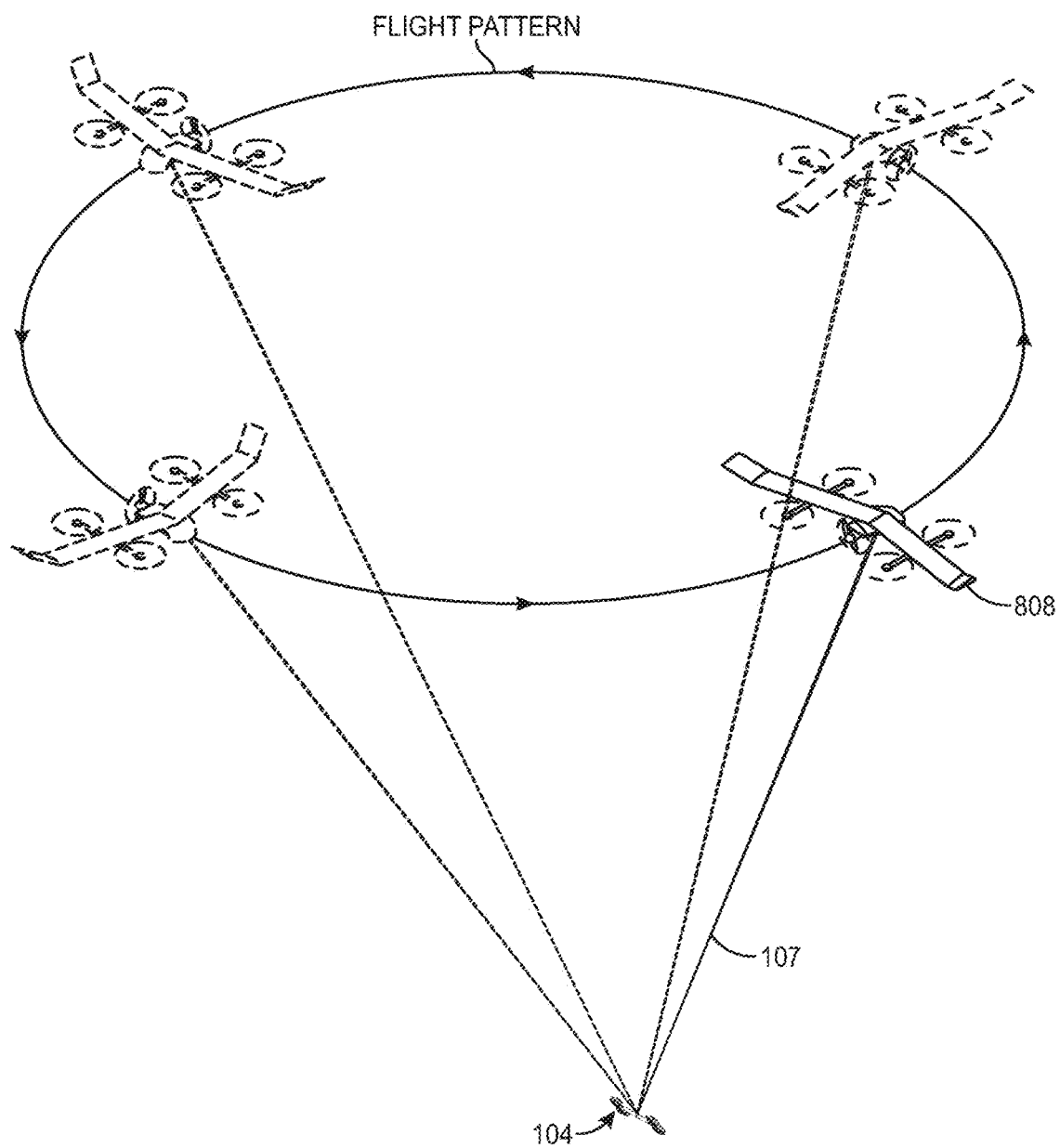
FIG. 10 illustrates an exemplary suspended aerial vehicle system with thruster stabilization while the mothership is in a holding pattern.

The precise positioning of the UAV 104 described herein that is enabled by the suspended aerial vehicle system may allow the UAV 104 to maintain a static position while the mothership 808 changes location during the flight pattern of the mothership 808. For instance, FIG. 10 shows a mothership 808 that may have a flight pattern consisting of a circular holding pattern while the UAV 104 maintains a substantially stationary position relative to a fixed reference point, such as a reference surface on the ground. Coordinated changes of the thrust engine and the winch system may reposition the UAV 104 relative to the mothership 808. For example, if the mothership 808 were taken as the fixed reference point for the UAV 104, such that the movement of the mothership 808 relative to the ground is ignored, it would appear that the UAV 104 is circling below the mothership 808 in a similar manner to the holding pattern that the mothership 808 exhibits in the illustration, demonstrating that the UAV 104 may continuously adjust the thrust vector of the thrust engine while the winch system may continuously adjust the length of the supporting line 107 in order to maintain a desired position relative to a fixed point. This process of continuous adjustment of the UAV 104 position or vector may occur while the mothership 808 is in motion such that, for example, both the UAV 104 and the mothership 808 are counter-rotating. Thus, the UAV 104 is capable of achieving any position within the envelope while the envelope is moving due to the mothership 808 moving without necessitating a change in the flight pattern of the mothership 808. The maximum circumference of the holding pattern that the mothership 808 may maintain while the UAV 104 is maintaining a static position relative to the fixed reference point may be governed by a maximum length of the supporting line 107.

Figure 11:
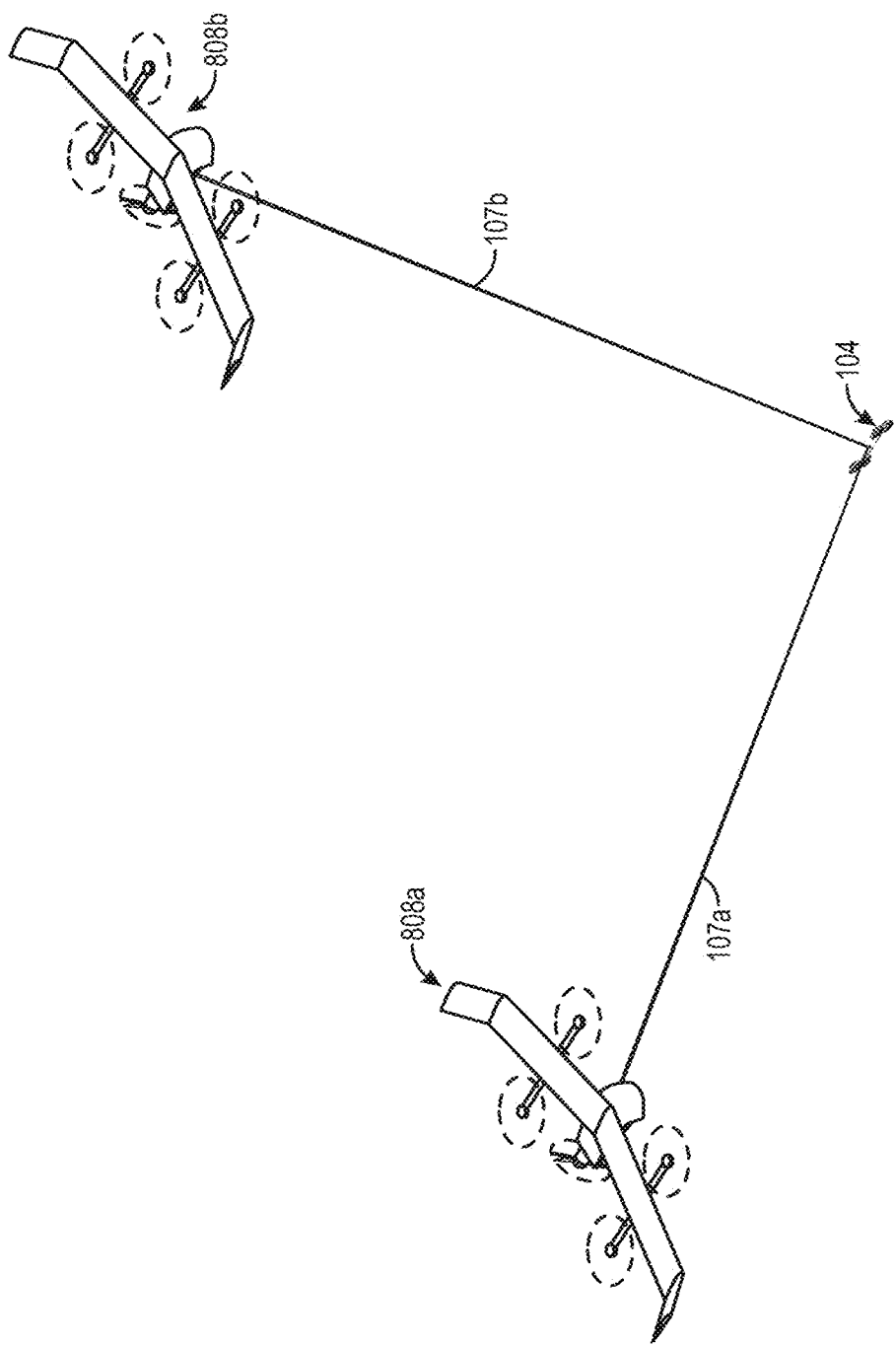
FIG. 11 illustrates an exemplary configuration of the suspended aerial vehicle system with thruster stabilization with multiple motherships.

FIG. 11 demonstrates an aspect of the present disclosure where a single UAV 104 may be connected to multiple motherships. In the illustration, the UAV 104 is supported by a first mothership 808*a* and a second mothership 808*b* via a first supporting line 808*a* and a second supporting line 808*b*, respectively. Each of supporting line 808*a* and supporting line 808*b* may be operated by a single winch system or multiple winch systems. The length of first supporting line 808*a* and second supporting line 808*b* may be adjusted in coordination with the thruster system of UAV 104 and in coordination with the flight pattern of first mothership 808*a* and second mothership 808*b* during operation of the suspended aerial vehicle system. The UAV 104 may be capable of achieving substantially any position within the envelope of each of mothership 808*a* and mothership 808*b*.

Figure 12:
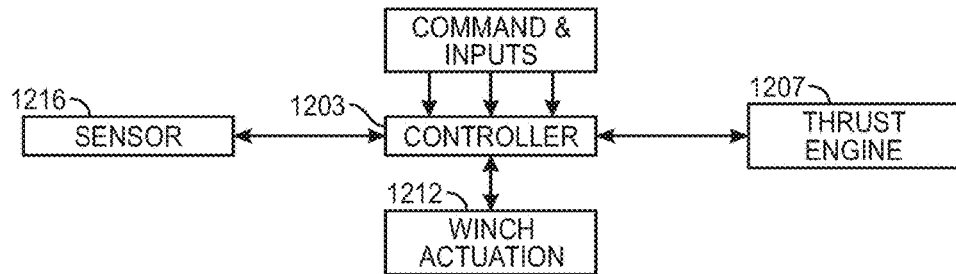
FIG. 12 illustrates an exemplary schematic diagram of electronic components of the suspended aerial vehicle system with thruster stabilization.

FIG. 12 illustrates a block diagram of a control system that may coordinate manipulation of the supporting line 107 and a thrust engine 1207 in order to position the UAV 104 at a desired location and/or orientation within the envelope. The system controller may include a controller 1203 that receives various command inputs, such as a desired location of the UAV 104. The controller 1203 may determine the necessary adjustments that need to be made to the length of the support line 107 through winch actuation 1212 and the thrust engine 1207 in order to move the UAV 104 from the initial position to the desired location. The controller 1203 may direct individual thrusters or thruster assemblies within the thrust engine 1207 to produce thrust in a direction and magnitude desirable such as to achieve any position and orientation of the UAV 104, such that a first thruster or second thruster assembly may have a first direction and/or first magnitude and a second thruster or second thruster assembly may have a second direction and/or second magnitude. It is also considered that the orientation of the thrust produced by the thrust engine 1207 relative to the UAV 104 may be static. The orientation of the UAV 104 may be changed by varying the thrust produced by individual thrusters on the UAV 104, as well as through varying tension through the supporting line 107 through a combination of spooling the supporting line 107 and varying the thrust. Decreasing or increasing tension within the supporting line 107 may serve other purposes as well. For instance, if the UAV 104 is traveling through a complex route, there may not be a direct line of sight between the UAV 104 and the anchor point. In this case, the UAV 104 may require greater "slack" within the supporting line 107 and so the controller 1203 may decrease tension within the supporting line 107.

In an embodiment where the suspended aerial vehicle system includes the mothership 808, thrust engine 1207 may include thrusters onboard the mothership 808 such that the system controller 1203 may coordinate and control thrusters onboard the UAV 104 and the mothership 808. Thus, the system controller 1203 may coordinate manipulation of the thrust of the mothership, thrust of the UAV 104, and variations in the supporting line 107 length. It is to be understood that when the system controller is 1203 is coordinating variations in the length of the supporting line 107, thrust attributes of the mothership 808, and thrust attributes of the UAV 104, such coordination may include making no changes to the supporting line 107 length, the thrust attributes of the mothership 808, and the thrust attributes of the UAV 104 when the system controller 1203 determines that not varying any combination of the attributes mentioned is desirable, up to and including scenarios where zero thrust production from at least one of the UAV 104 and the mothership 808 is desirable. For instance, the system controller 1203 may dynamically manipulate the supporting line 107 length in response to variations in the position of the UAV 104 in order to maintain the tautness of the supporting line 107 and to prevent jerking of the UAV 104. Simultaneously or concurrently, the system controller 1203 may dynamically manipulate the thrust conditions of the mothership and/or the UAV 104 to achieve a desired position and orientation of the UAV 104.

The system controller 1203 may receive feedback ("sensor data") from a sensor 1216 that may serve any of several purposes, such as to optimize total energy output by the suspended aerial vehicle system and to perform closed loop control while positioning the UAV 104. For example, the sensor data may allow the controller 1203 to calculate an optimized lift direction and magnitude that may be produced by the thrust engine 1207 relative to the lift direction and magnitude produced by the supporting line 107, as a function of the length of supporting line 107 used and/or the relative orientation of the supporting line 107 and/or UAV 104. Sensor 1216 may measure attributes of the UAV 104 and supporting line 107, such as supporting line 107 tension and force profile and inertial measurements of the UAV 104. Sensor 1216 may measure flight attributes of the mothership 808. Sensor feedback from the mothership 808 and UAV 104 may be used during operation of the suspended aerial vehicle system to coordinate the flight of each of the mothership 808 and the UAV 104 while connected by supporting line 107. It is conceived that these attributes may be measured or estimated indirectly. The system controller 1203 may use various inputs to determine optimal supporting line 107 angle and thrust angle and magnitude. For instance, the suspended aerial vehicle system may include a wind sensor that calculates wind gust direction and magnitude. The system controller 1203 may direct the thrust engine 1207 to produce a counter thrust to substantially negate the effect of wind on the position of the UAV 104. The supporting line 107 may assume the majority of the vertical load of the UAV 104 in order to allow the thrust engine 1207 to produce a lateral thrust for gust loading. Sensor 1216 may provide other data relevant to operation of the system that may be used by the controller 1203 to direct the winch actuator 1212 and thruster engine 1207. For example, optic sensors may be used in determining whether the flight path is clear of obstacles, and if not, what alternative flight path may be clear. Sensor 1216 may be embodied as a single sensor or multiple sensors, and may be located within the system, adjacent to the system, or remotely from the system while still capable of measuring attributes relevant to the operation of the system.

Figure 13:
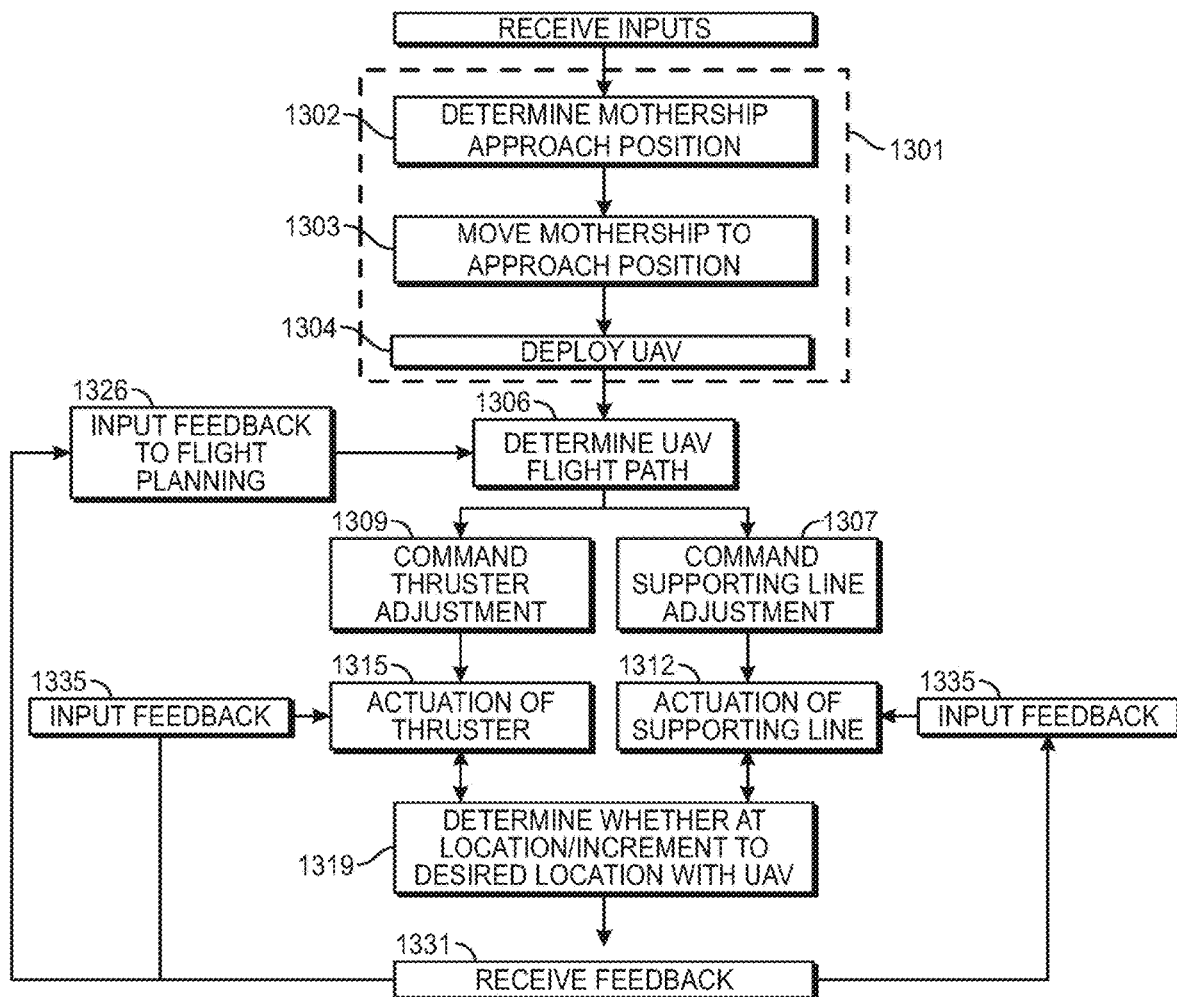
FIG. 13 illustrates an exemplary method of operating the suspended aerial vehicle system with thruster stabilization.

FIG. 13 shows a flowchart of the operation of the suspended aerial vehicle system as it repositions the UAV 104 from an initial location to a desired location. In step 1306, the controller 1203 may determine a flight path to move the UAV 104 from the initial position to the desired position. The controller 1203 may receive the desired location as an input. The controller 1203 may also receive or determine the initial position of the UAV 104. Determining the flight path may involve determining an optimal length of supporting line 104 and an optimal thrust angle and magnitude.

In step 1307, the controller 1203 may direct the supporting line 107 to adjust, while in step 1309, the controller 1203 may direct the thrust engine 1207 to adjust, such that the length of the supporting line 107 and the thrust engine 1207 may adjust in a coordinated manner. This may lead to the actuation of the thruster in step 1315 and actuation of the supporting line in 1312, which may also occur in a coordinated manner.

In step 1319, the controller 1203 may determine when the UAV 104 has reached the desired location and may direct the supporting line 107 and thrust engine 1207 to adjust so as to maintain the position of the UAV 104, although the controller 1203 may end the loop. The adjustments to the supporting line 107 and thrust engine 1207 may be made on a time-basis, which is to say that the controller 1203 may determine an optimal length of supporting line 107 and thruster angle and magnitude at several or substantially all points along the flight path, such as to ensure a smooth flying experience or to navigate through a complex flight path.

Step 1331 shows how the controller 1203 may receive feedback, such as from the sensor 1216. The controller 1203 may determine optimal length of supporting line 107 and thrust angle and magnitude in "real time," which is to say that the controller 1203 may regularly or continually use feedback from the system to optimize the operation of the suspended aerial vehicle system in a coordinated manner. For example, the controller 1203 may use data from sensor 1216 to determine an optimal flight as the UAV 104 is in transit. In step 1335, the controller 1203 may utilize the feedback from the sensor 1216 in order to continuously adjust the length of supporting line 107 and thrust angle and magnitude until the controller 1203 has determined that the UAV 104 has arrived at the desired location.

Other types of feedback may be received during step 1331 and utilized by the controller 1203 while directing the operation of the suspended aerial vehicle system. The feedback may be received from any number of wired or wireless sources that the controller 1203 is able to communicate with, such as a command center, a second drone, and a transceiver. For instance, the controller 1203 may receive weather data that may impact the flight path for the suspended aerial vehicle system. The controller 1203 may utilize the weather data in developing a new flight path.

FIG. 13 further includes steps for the operation of the suspended aerial vehicle system that includes a mothership 808, as shown in elective steps 1301. The controller 1203 may receive a desired location for the UAV 104 as an input. Step 1302 shows that the controller may determine an approach position for the mothership 808, wherein the approach position is a location of the mothership 808 that enables the UAV 104 to be capable of reaching the desired position when the UAV 104 is deployed. The controller 1203 may determine a mothership 808 flight path to move the mothership 808 from the mothership 808 initial position to the approach position in step 1303. The controller 1203 may also receive or determine the initial position of the mothership 808. Determining the mothership 808 flight path may involve determining an optimized route between the mothership 808 initial position and the approach position. The optimized route may balance travel speed, duration of flight, use of long range versus short range flight apparatuses, obstacles, energy efficiency, desired entry angle, and other factors that impact the flight of the mothership. The controller 1203 may direct the mothership to hover or circle when the mothership 808 has substantially reached the approach position. The controller 1203 may then direct the UAV 104 to deploy from the mothership 808, as shown in step 1304. The UAV 104 may also be deployed from the mothership 808 at any point during the transit of the mothership 808. Once deployed, the UAV 104 may use the method outlined herein to arrive at a desired location.

Different aspects of the process outlined in FIG. 13 may be conducted by one or more human users. For instance, a remote operator may determine a route for the mothership and coordinate the flight of the mothership, such as by remotely steering the mothership. Similarly, the remote operator may be able control the deployment of the UAV 104, the flight of the UAV 104 and operate the winch system.

The system controller 1203 may be embodied, at least in part, as one or more embedded or general-purpose processors, computers, processing devices, or computing devices having memory. The system controller 1203 may also be embodied, in part, as various functional and/or logic (e.g., computer-readable instruction, code, device, circuit, processing circuit, etc.) elements executed or operated to perform aspects of the embodiments described herein. The system controller 1203 may be mounted and secured within or connected to any member of the suspended aerial vehicle system. Further, the system controller 1203 may be located remotely from the system and may otherwise be in direct or indirect communication with the system.

The system controller 1203 may include a processor, a memory, a storage device, and input/output (I/O) devices. Some or all of the components may be interconnected via a system bus. The processor may be single- or multi-threaded and may have one or more cores. The processor may execute instructions, such as those stored in the memory and/or in the storage device. Information may be received and output using one or more of the I/O devices.

The memory may store information, and may be a computer-readable medium, such as volatile or non-volatile memory. The storage device(s) may provide storage for the computer system and may be a computer-readable medium. In various embodiments, the storage device(s) may be one or more of a flash memory device, a hard disk device, an optical disk device, a tape device, or any other type of storage device.

The I/O devices may provide input/output operations for the computer system. The I/O devices may include a keyboard, a pointing device, and/or a microphone. The I/O devices may further include a display unit for displaying graphical user interfaces, a speaker, and/or a printer. External data may be stored in one or more accessible external databases.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Figure 14:
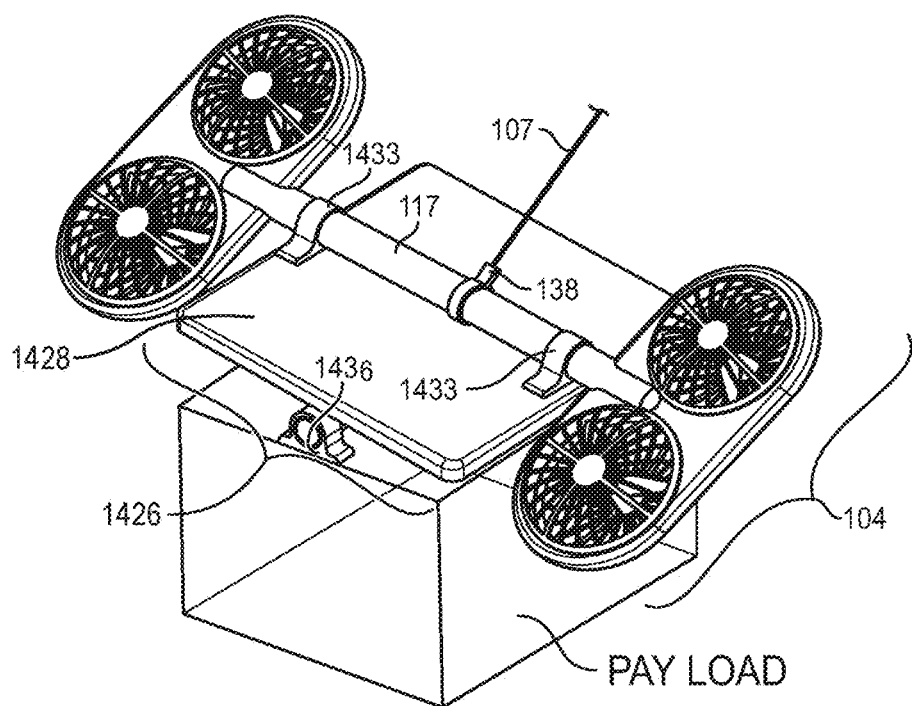
FIG. 14 illustrates an exemplary configuration of the suspended aerial vehicle system with thruster stabilization with a payload attachment.

FIG. 14 demonstrates an aspect of the present disclosure in which the UAV 104 may include a payload attachment mechanism 1426 such that the UAV 104 is capable of connecting with a payload. In the embodiment shown, the payload attachment mechanism 1426 includes a platform 1428 that may secure to the payload. The payload attachment mechanism 1426 may include a bracket 1433, such as a rotary bearing or a flexure, that may attach to the platform 1428 such that the axle 117 may be secured within the bracket 1433 and substantially connected to the platform 1428. The bracket 1433 may allow the axle 117 to rotate relative to the platform 1428 in a single axis or multiple axes.

The platform 1428 may include a means for gripping a payload and subsequently releasing the payload at a designated location, upon signal, or upon other indicators of release. For example, a user may clip the payload to the platform 1428 using clasps (not shown) that are contained by or connected to the platform 1428. The clasps may release the payload when the UAV 104 has arrived at a delivery point. Other forms of gripping the payload are possible. For instance, the platform 1428 may include means for noncontact attachment, such as a magnetic attachment system.

The platform 1428 may utilize a mating system, wherein clasps on the platform 1428 may interlock with an interface on the payload. The mating system may be remotely operated, i.e., a pilot may determine when the UAV 104 has arrived at a delivery point and instruct the UAV 104 to retract the clasps such that the payload may be separated from the UAV 104 and placed at the delivery point. The mating system may also operate autonomously, or without human intervention. For example, the UAV 104 may determine that the UAV 104 is at the delivery point, such as from GPS positioning or machine vision, and release the clasps on the payload, leaving the payload at the delivery point. Similarly, the UAV 104 may be used to retrieve a payload by sending the UAV 104 to a specified location, wherein the platform 1428 may be able to secure said payload. In an aspect, the platform 1428 may include an enclosure such that the payload may be secured within the enclosure prior to flight.

The platform 1428 may be connected to the axle 117 of the UAV 104, which may enable the platform 1428 to rotate independently of the UAV 104. In an aspect of the disclosure, the payload attachment mechanism 1426 may further include means for achieving additional rotational, positional, and/or translational degrees of freedom for the payload. For instance, the payload attachment mechanism 1426 may include a gimbal mechanism 1436 that connects the platform 1428 to the payload. The gimbal mechanism 1436 may also be a slider mechanism. The additional degrees of freedom for the payload relative to the platform 1428 may be achieved passively or actively. The payload attachment mechanism 1426 may include a means for connecting the platform 1428 and the UAV 104 such that the platform 1428 and the UAV 104 may not be in direct contact. For instance, a second supporting line may connect the platform 1428 and the UAV 104, such that, for example, the platform 1428 is capable of suspending independently from the orientation of the UAV 104. In this illustration, the gimbaling between the UAV 104 and the payload allows independent alignment of payload from the net thrust vector of the assembly, enabling precision positioning of the payload such that the payload may maintain a neutral orientation while the UAV 104 may be tilted.

Figure 15:
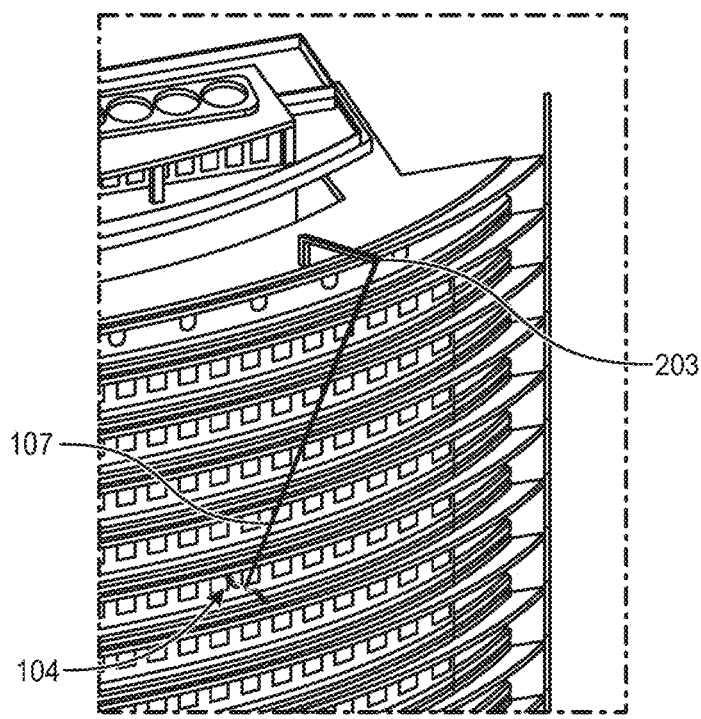
FIG. 15 illustrates an exemplary configuration of the suspended aerial vehicle system with thruster stabilization with specific functional utilization.

In an aspect of the present disclosure, the suspended aerial vehicle system may be equipped for specified functional utilization. The UAV 104 may attach to a functional module engineered to allow the suspended aerial vehicle system to engage in a specific task or range of tasks. For example, it may be desirable to use the suspended aerial vehicle system to perform cleaning in a difficult-to-access location, such as, for example, high-rise windows, wind turbine blades, and solar panels. In this case, illustrated by FIG. 15, the module may include the software, firmware, and/or hardware that may allow the suspended aerial vehicle system to access and perform the cleaning. For instance, the cleaning module may include cleaning hardware such as a soap reservoir, water reservoir, and a squeegee or other cleaning tool, such as a pressure washing mechanism. The cleaning module may also include mechanisms that allow the UAV 104 to maintain contact with the surface, such as selectively activated suction cups. During operation, the UAV 104 may be brought to the proper elevation of the surface that is desired to be cleaned through coordination of the supporting line 107 and thruster. It may be desirable to utilize an anchor point 203 that is above the desired cleaning location, such as near the top of the building. In the example shown, the anchor point 203 is fixed to an extended pole that is located at the top of the building. The UAV 104 may direct the thruster to produce force in a direction allowing for the UAV 104 to contact the surface with the window cleaning module while the supporting line bears a necessary amount of the weight of the UAV 104. The suspended aerial vehicle system may activate the cleaning module to perform the tasks necessary to bring the surface to a clean state.

Another example of a functional module could be a demolition disposal module. The demolition disposal module may include, for example, tools used by explosive defusing robots, such as a machine vision-enabled camera, an actuated arm, and a means for bomb neutralization. The UAV 104 may descend above a suspected device, determine if the device constitutes a threat, and if so, neutralize the suspected device.

In some embodiments, the UAV 104 may not include a platform. The functional module may connect directly to other elements of the UAV 104 such that the UAV 104 may be designed for a specific function, rather than having the means to provide interchangeable functionality. For example, in a configuration where the suspended aerial vehicle system is configured to combat fires, the UAV 104 may have a direct and/or permanent connection to a firehose.

Figure 16:
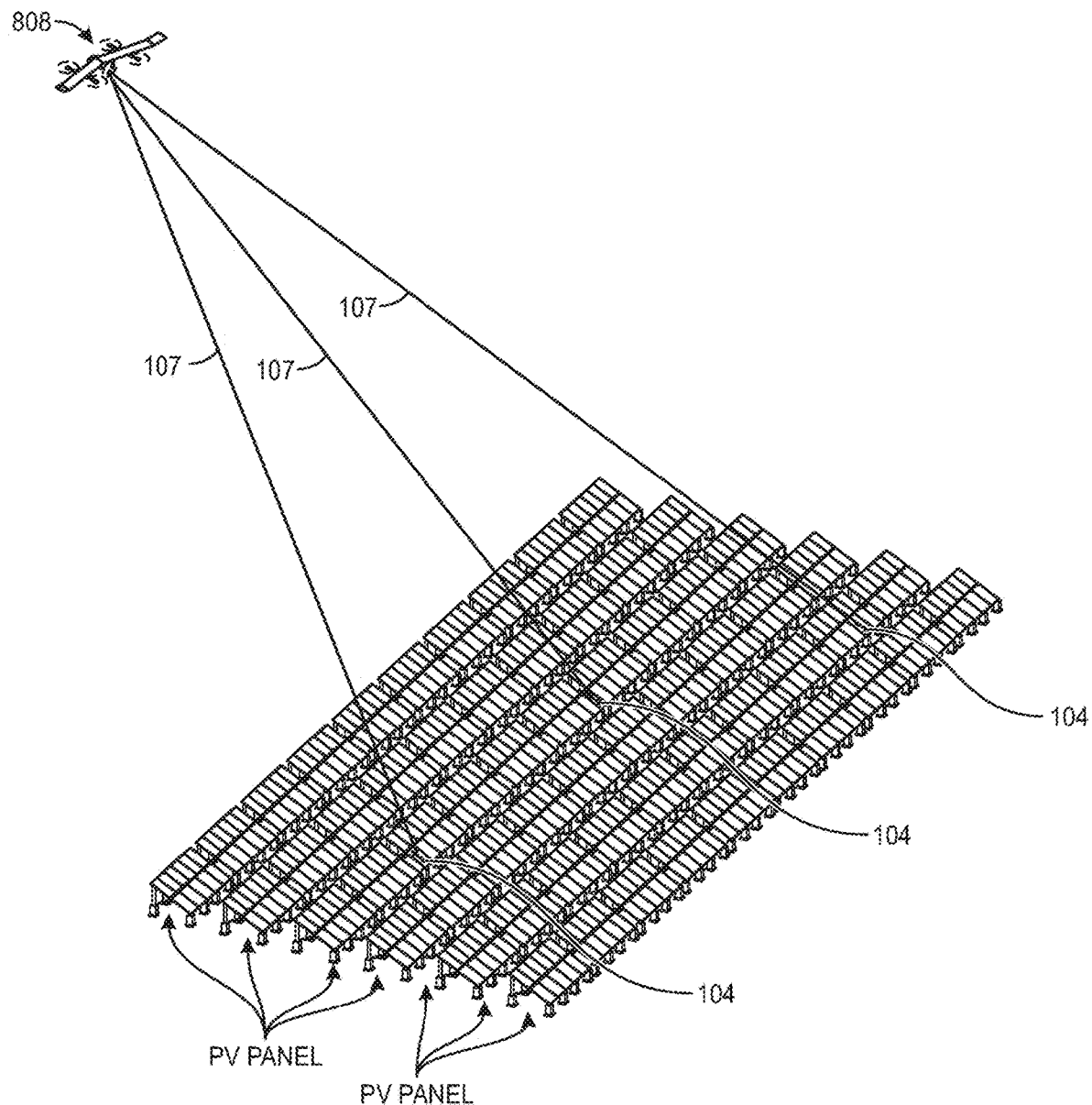
FIG. 16 illustrates an exemplary configuration of the suspended aerial vehicle system with thruster stabilization while cleaning a photovoltaic array system.

FIG. 16 illustrates an example where the aerial vehicle system is configured to clean and/or maintain a photovoltaic array (PV) system. The mothership 808 may arrive in the vicinity of the PV system and enter into a holding pattern. Alternatively, when the suspended aerial vehicle system does not incorporate the mothership 808, such as when the anchor point 203 is fixed to a stationary area, the suspended aerial vehicle system may have a fixed anchor point 203 that is located above the PV system. The UAV 104 may be deployed to a first PV panel. The UAV 104 may include a functional module for cleaning PV systems, such as a functional module that is similar to the window cleaning module described. When the UAV 104 has finished sufficiently cleaning a first PV panel, the UAV 104 may relocate to a second PV panel and commence cleaning the second PV panel. This process may continue until the PV array system has been sufficiently cleaned. A single mothership or anchor point 203 may be attached to multiple UAVs, such that each UAV of the multitude of UAVs may be engaged in cleaning the PV array system. This has the effect of decreasing the total time engaged in cleaning while increasing the efficiency of cleaning.

Figure 17:
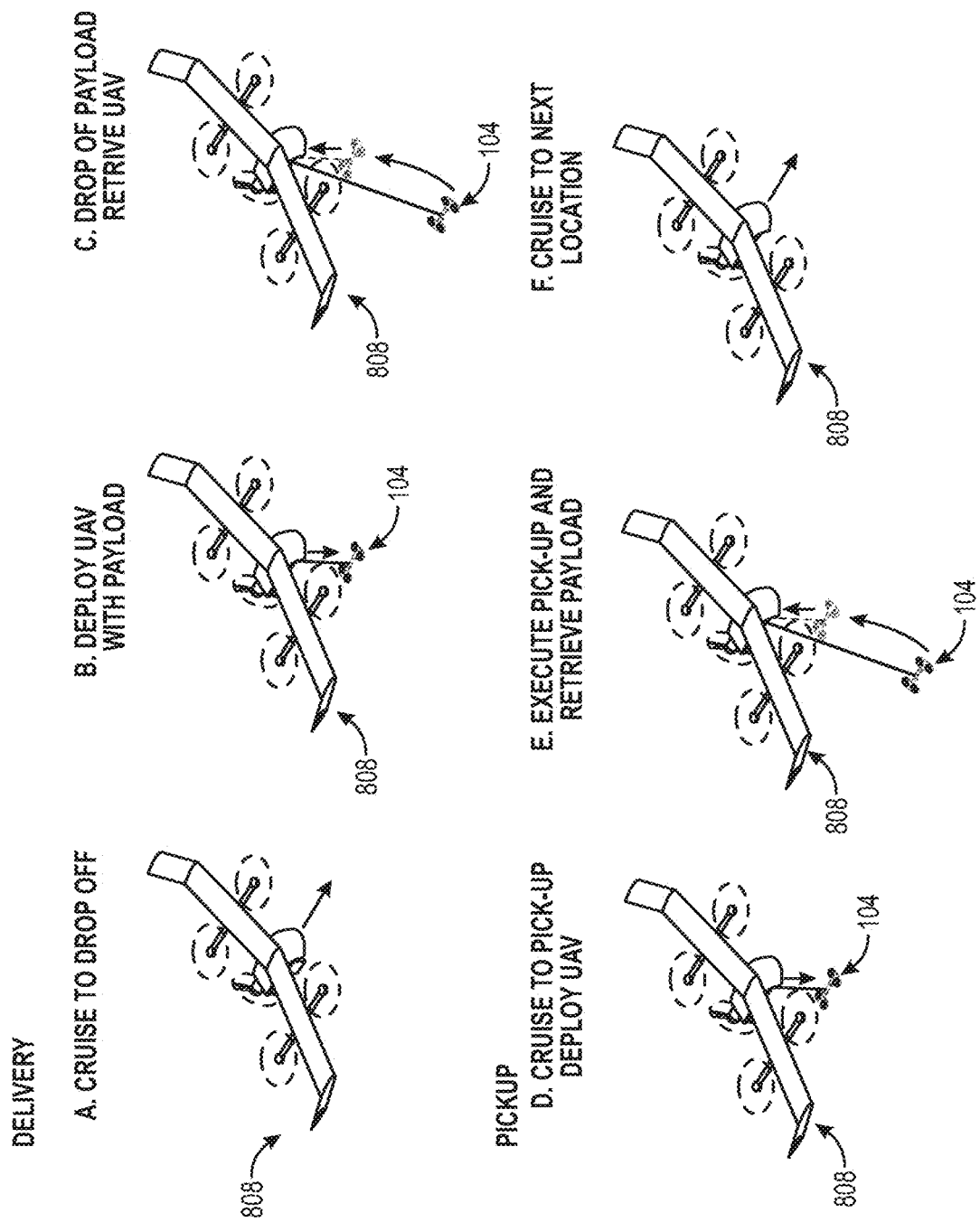
FIG. 17 illustrates an exemplary method for payload transfer of the suspended aerial vehicle system with thruster stabilization.

In an aspect of the present disclosure, the suspended platform is utilized for payload delivery, as demonstrated by FIG. 17. The payload may be attached to the UAV 104. The payload may be secured by the platform 1428, which may occur manually or autonomously. The payload may be attached to the UAV 104 at a launch point. The launch point may be predetermined, such as a warehouse or logistics waypoint. The payload may be attached to the UAV 104 on the ground while the UAV 104 is docked on the mothership 808. Once the mothership 808 is in the air with the payload, the mothership 808 may cruise on a route that includes a drop off point, as shown in FIG. 17A.

FIG. 17B shows that when the mothership 808 is near the drop off point, the mothership 808 may deploy the UAV 104. This may involve the mothership 808 transitioning from flight mode to hover mode. The UAV 104 may fly to the drop off point, using the process outlined previously, and disengage with the payload, leaving the payload at the drop off point, as shown in FIG. 17C. The UAV 104 may be recalled to the mothership 808.

A reversal of this process may be used in which the system is sent to retrieve a payload from a retrieval point, as demonstrated by FIGS. 17D-F. Similarly, the system may be used to retrieve a payload from a retrieval point and delivered to a drop off point.

Figure 18:
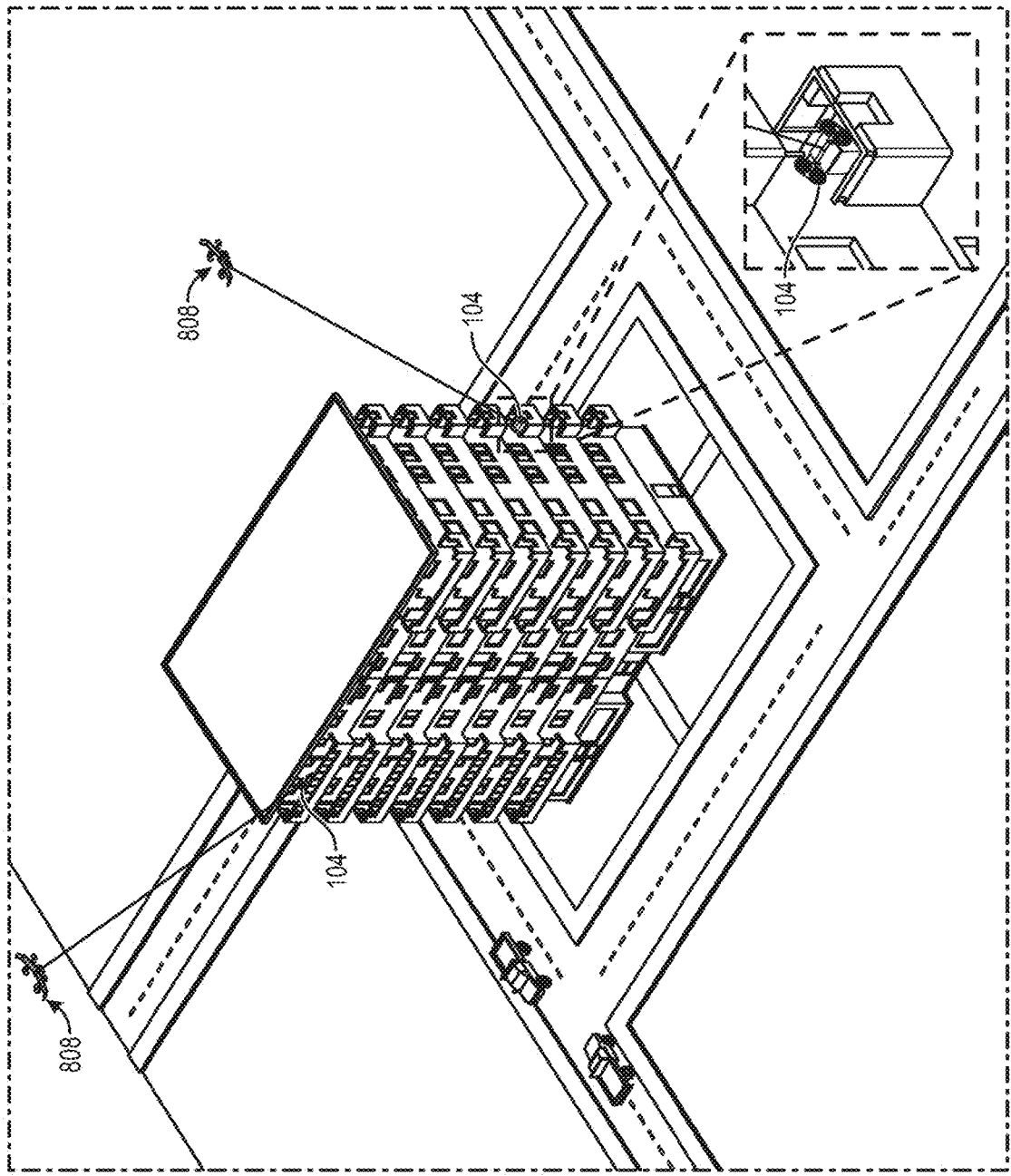
FIG. 18 illustrates an exemplary suspended aerial vehicle system with thruster stabilization during payload transfer.

The ability of the UAV 104 to navigate tight spaces while delivering payloads is demonstrated in FIG. 18. In this example, the suspended aerial vehicle system is able to deliver a payload to or recover a payload from a balcony that may be partially or substantially enclosed, such as by an overhang. The suspended aerial vehicle system, through the ability to deliver and retrieve payloads from tight spaces, may similarly access specific payload sites and payload storage devices, such as parcel lockers. The payload sites and payload storage devices may be any or all of the characteristics related to automated, manual, stationary, and mobile systems.

It should be understood that the prior examples of functionality provided herein are not intended to be limited. The UAV 104 may be configured to provide other types of functionality without departing from the scope of the invention.

Some enumerated example implementations (EIs) are provided below, without limitation:

EI 1: A suspended aerial vehicle system, comprising: a mothership, an aerial vehicle physically connected to the mothership, a controller configured to coordinate a mothership thrust characteristic and an aerial vehicle thrust characteristic.

EI 2: The suspended aerial vehicle system of EI 1, wherein the mothership has a lifting surface of a fixed wing aircraft and a thruster characteristic of a rotorcraft.

EI 3: The suspended aerial vehicle system of EI 1, wherein the aerial vehicle is physically connected to the mothership by a supporting line.

EI 4: The suspended aerial vehicle system of EI 3, wherein the mothership supports at least a portion of the aerial vehicle through the supporting line.

EI 5: The suspended aerial vehicle system of EI 3, wherein the supporting line is part of a winch system that can actuate to adjust the length of the supporting line.

EI 6: The suspended aerial vehicle system of EI 5, wherein the controller is further configured to coordinate the actuation of the winch system.

EI 7: The suspended aerial vehicle system of EI 6, wherein coordinating the mothership, aerial vehicle, and winch system comprises varying characteristics of a thrust produced by thrusters onboard the aerial vehicle, varying the length of the supporting line, and managing the flight pattern of the mothership.

EI 8: The suspended aerial vehicle system of EI 1, further comprising a dock located on the mothership that connects between the mothership and the aerial vehicle.

EI 9: The suspended aerial vehicle system of EI 1, further comprising a second aerial vehicle physically connected to the mothership.

EI 10: A suspended aerial vehicle system, comprising an aerial vehicle with a thruster configured to produce directionally-focused propulsion, and a supporting line that attaches to a load-bearing point on the aerial vehicle on a first end of the supporting line and is arranged to be capable of supporting at least some of the weight of the aerial vehicle.

EI 11: The suspended aerial vehicle system of EI 10, wherein the supporting line is attached to an anchor point on a second end of the supporting line.

EI 12: The suspended aerial vehicle system of EI 10, further comprising a mechanical device that is connected to the supporting line and that allows the length or tension of the supporting line to vary.

EI 13: The suspended aerial vehicle system of EI 12, wherein the mechanical device is a winch system, wherein the winch system further comprises a winch that is located near an anchor point.

EI 14: The suspended aerial vehicle system of EI 12, further comprising a controller that directs manipulation of the supporting line by the mechanical device and manipulation of the thruster propulsion in order to position the aerial vehicle at a desired location.

EI 15: The suspended aerial vehicle system of EI 14, wherein manipulation of the supporting line and manipulation of the thruster propulsion is performed in a coordinated manner.

EI 16: A system for controlling a suspended aerial vehicle system, comprising: a controller configured to receive information regarding a desired location of an aerial vehicle, determine a flight path for the aerial vehicle, comprising determine adjustments that need to be made to the length of a support line attached to the aerial vehicle, determine adjustments that need to be made to a thruster on the aerial vehicle, and coordinate manipulation of the supporting line by a mechanical device and manipulation of the thruster in order to position the aerial vehicle to the desired location.

EI 17: The system for controlling a suspended aerial vehicle system of EI 16, wherein the flight path may be determined on a continuous basis.

EI 18: The system for controlling a suspended aerial vehicle system of EI 17, wherein the flight path is comprised of a series of incremental locations along a route between a current location of the aerial vehicle and the desired location, wherein the adjustments that need to be made to the length of a support line attached to the aerial vehicle and the adjustments that need to be made to a thruster on the aerial vehicle are the adjustments needed to move the aerial vehicle from a first incremental location to a second incremental location.

EI 19: The system for controlling a suspended aerial vehicle system of EI 16, wherein determining the flight path further comprises regularly using feedback to determine the adjustments that need to be made to the length of a support line attached to the aerial vehicle and the adjustments that need to be made to a thruster on the aerial vehicle.

EI 20: The system for controlling a suspended aerial vehicle system of claim 16, wherein manipulation of the supporting line comprises directing a mechanical device to alter the length or tension of the supporting line.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art.

What is claimed is:

1. An aerial vehicle system, comprising:
a mothership, wherein the mothership is a rotorcraft such that the mothership generates thrust via an unducted rotor allowing vertical takeoff and landing;
an aerial vehicle, wherein the aerial vehicle is a rotorcraft such that the aerial vehicle generates thrust via an unducted rotor;
a winch system provided between the mothership and the aerial vehicle, wherein the winch system includes a supporting line and is configured to actuate to adjust a length of the supporting line; and
a controller configured to detect a wind condition on the aerial vehicle and determine a wind response,
wherein determining a wind response comprises one or both of:
adjusting a magnitude of the rotor of the aerial vehicle, wherein adjusting the magnitude of the rotor of the aerial vehicle comprises directing the rotor of the aerial vehicle to produce a non-vertical thrust to at least partially negate a force created by the wind condition; and
adjusting the length of the supporting line, wherein adjusting the length of the supporting line comprises directing the winch system to assume at least a portion of a vertical load of the aerial vehicle by winding in the supporting line to coordinate tension within the supporting line.

2. The aerial vehicle system of claim 1, wherein the mothership has both (i) lifting surfaces and propeller characteristic of a fixed wing aircraft and (ii) rotors characteristic of a rotorcraft.

3. The aerial vehicle system of claim 1, wherein the controller is further configured to coordinate a variable thrust availability in non-vertical axes with a supporting line angle and a supporting line length.

4. The aerial vehicle system of claim 1, wherein the mothership supports a weight of the aerial vehicle through the supporting line.

5. The aerial vehicle system of claim 1, wherein the controller is further configured to adjust the magnitude of the rotor of the aerial vehicle or the length of the supporting line to position the aerial vehicle at any point within an envelope, wherein the envelope is a sphere that encircles the winch system at a maximum length of the supporting line.

6. The aerial vehicle system of claim 1, further comprising a second aerial vehicle physically connected to the mothership.

7. The aerial vehicle system of claim 1, wherein a position maintained by the aerial vehicle is static relative to a fixed reference point.

8. The aerial vehicle system of claim 7, wherein the fixed reference point is located on the mothership.

9. The aerial vehicle system of claim 8, wherein the controller is further configured to vary characteristics of a thrust produced by thrusters onboard the aerial vehicle, vary the length of the supporting line, and manage a flight pattern of the mothership.

10. A system for controlling an aerial vehicle system, comprising:
a controller configured to:
receive information regarding a wind condition on an aerial vehicle, wherein the aerial vehicle is a rotorcraft configured to generate thrust;
determine a wind response for the aerial vehicle;
determine adjustments to be made to a length of a supporting line attached to the aerial vehicle to assume at least a portion of a vertical load of the aerial vehicle in the supporting line;
determine adjustments to be made to a thruster on the aerial vehicle to produce a non-vertical thrust; and
control the supporting line or the thruster to at least partially negate an effect of the wind condition on a position of the aerial vehicle.

11. The system of claim 10, wherein the wind response is determined on a continuous basis.

12. The system of claim 10, wherein the controller is further configured to manipulate a magnitude of the thruster or the length of the supporting line to position the aerial vehicle at any point within an envelope, wherein the envelope is a sphere that encircles a mechanical device usable to manipulate the supporting line at a maximum length of the supporting line.

13. The system of claim 10, wherein the aerial vehicle is connected to a mothership via the supporting line.

14. The system of claim 13, wherein the mothership is a rotorcraft configured to generate thrust allowing vertical takeoff and landing.

15. A method for controlling an aerial vehicle system, comprising:
receiving information regarding a wind condition on an aerial vehicle, wherein the aerial vehicle is a rotorcraft configured to generate thrust;
determining a wind response for the aerial vehicle;
determining adjustments to be made to a length of a supporting line attached to the aerial vehicle to assume at least a portion of a vertical load of the aerial vehicle in the supporting line;
determining adjustments to be made to a thruster on the aerial vehicle to produce a non-vertical thrust; and
controlling the supporting line or the thruster to at least partially negate an effect of the wind condition on a position of the aerial vehicle.

16. The method of claim 15, further comprising determining the wind response on a continuous basis.

17. The method of claim 15, further comprising manipulating a magnitude of the thruster or the length of the supporting line to position the aerial vehicle at any point within an envelope, wherein the envelope is a sphere that encircles a mechanical device usable to manipulate the supporting line at a maximum length of the supporting line.

18. The method of claim 15, wherein the aerial vehicle is connected to a mothership via the supporting line.

19. The method of claim 18, wherein the mothership is a rotorcraft configured to generate thrust allowing vertical takeoff and landing.

* * * * *